US012371944B2

(12) United States Patent
Marchal et al.

(10) Patent No.: US 12,371,944 B2
(45) Date of Patent: Jul. 29, 2025

(54) ELECTROMECHANICAL ACTUATOR AND SHADING DEVICE COMPRISING SUCH AN ELECTROMECHANICAL ACTUATOR

(71) Applicant: SOMFY ACTIVITES SA, Cluses (FR)

(72) Inventors: Diane Marchal, Cluses (FR); Adrien Brondex, Cluses (FR); Margaux Foissard, Cluses (FR); Rémi Sourain, Cluses (FR)

(73) Assignee: SOMFY ACTIVITES SA, Cluses (FR)

( * ) Notice: Subject to any disclaimer, the term of this patent is extended or adjusted under 35 U.S.C. 154(b) by 0 days.

(21) Appl. No.: 18/802,076

(22) Filed: Aug. 13, 2024

(65) Prior Publication Data

US 2025/0059829 A1 Feb. 20, 2025

(30) Foreign Application Priority Data

Aug. 14, 2023 (FR) ...................................... 2308699

(51) Int. Cl.
*E06B 9/72* (2006.01)
*E06B 9/80* (2006.01)

(52) U.S. Cl.
CPC .................. *E06B 9/72* (2013.01); *E06B 9/80* (2013.01); *E06B 2009/725* (2013.01)

(58) Field of Classification Search
CPC ................. E06B 9/72; E06B 2009/905; E06B 2009/725; E06B 9/68; E06B 9/42; F16D 67/00
See application file for complete search history.

(56) References Cited

U.S. PATENT DOCUMENTS 2,758,644 A 8/1956 Jacques
4,848,433 A 7/1989 Bresson et al.
5,399,129 A * 3/1995 Ciolli .................... F16D 43/211 192/81 C
6,173,825 B1 1/2001 Liu
6,700,246 B1 * 3/2004 Bruhn ..................... F16D 51/02 192/81 C
7,839,035 B2 11/2010 Hwaung
8,253,288 B2 * 8/2012 Lagarde .................... E06B 9/72 310/77

(Continued)

FOREIGN PATENT DOCUMENTS

CN 202 431 792 9/2012
EP 3 561 216 10/2019

OTHER PUBLICATIONS

Preliminary Search Report for FR 2308699 dated Feb. 20, 2024.

(Continued)

*Primary Examiner* — Abe Massad
(74) *Attorney, Agent, or Firm* — B. Aaron Schulman, Esq.; Stites & Harbison PLLC

(57) ABSTRACT

An electromechanical actuator comprises a casing, an electric motor, a gearbox, a spring-applied brake (25), and a centring shaft (71). The brake (25) comprises a coil spring (48), a drum (49), an input member (50) and an output member (51). The output member (51) comprises a first bore (73). The shaft (71) is mounted inside the first bore (73) of the output member (51) and a bore of a sun gear (40) of a reduction stage (38) of the gearbox. The drum (49) comprises a shoulder (90). Furthermore, a planet carrier (66) of the reduction stage (38) is configured to bear against the shoulder (90) of the drum (49).

20 Claims, 9 Drawing Sheets

(56) References Cited

U.S. PATENT DOCUMENTS

| | | | | |
|---|---|---|---|---|
| 8,277,358 | B2 * | 10/2012 | Gasparrini | E06B 9/68 475/331 |
| 8,469,171 | B2 * | 6/2013 | Lagarde | F16D 67/00 192/223.4 |
| 8,511,364 | B2 | 8/2013 | Anderson et al. | |
| 9,057,408 | B2 | 6/2015 | Dupielet et al. | |
| 9,631,425 | B2 | 4/2017 | Campagna | |
| 9,689,202 | B2 * | 6/2017 | Lin | F16H 1/46 |
| 11,293,225 | B2 * | 4/2022 | Heredia | E06B 9/72 |
| 11,643,873 | B2 | 5/2023 | Schuehmacher et al. | |
| 11,781,378 | B2 | 10/2023 | Caregnato et al. | |
| 11,873,882 | B2 | 1/2024 | Sun et al. | |
| 12,009,707 | B2 | 6/2024 | Robert et al. | |
| 12,078,012 | B2 | 9/2024 | Caillat et al. | |
| 12,091,914 | B2 | 9/2024 | Campagna et al. | |
| 2004/0124727 | A1 | 7/2004 | Lau | |
| 2005/0035238 | A1 | 2/2005 | Fun | |
| 2009/0242332 | A1 | 10/2009 | Anderson et al. | |
| 2010/0320855 | A1 | 12/2010 | Lagarde et al. | |
| 2015/0308188 | A1 | 10/2015 | Lin et al. | |
| 2015/0364969 | A1 | 12/2015 | Brondex | |
| 2016/0326801 | A1 | 11/2016 | Blair et al. | |
| 2016/0376842 | A1 | 12/2016 | Brondex | |
| 2017/0012493 | A1 | 1/2017 | Fukushima et al. | |
| 2018/0283076 | A1 | 10/2018 | Gorosin et al. | |
| 2019/0103794 | A1 | 4/2019 | Tollance et al. | |
| 2019/0218859 | A1 | 7/2019 | Campagna | |
| 2020/0180009 | A1 | 6/2020 | Lagarde | |
| 2020/0332596 | A1 | 10/2020 | Sonzini | |
| 2020/0340300 | A1 | 10/2020 | Sonzini et al. | |
| 2020/0347672 | A1 | 11/2020 | Sonzini et al. | |
| 2020/0378182 | A1 | 12/2020 | Heredia et al. | |
| 2021/0032931 | A1 | 2/2021 | Jang | |
| 2021/0156196 | A1 | 5/2021 | Tao | |
| 2021/0246724 | A1 | 8/2021 | Schuehmacher et al. | |
| 2021/0262286 | A1 | 8/2021 | Campagna et al. | |
| 2021/0301592 | A1 | 9/2021 | Hebeisen et al. | |
| 2021/0310305 | A1 * | 10/2021 | Heredia | E06B 9/90 |
| 2022/0090446 | A1 | 3/2022 | Lu | |
| 2022/0231575 | A1 | 7/2022 | Sun et al. | |
| 2022/0341258 | A1 | 10/2022 | Yu et al. | |
| 2023/0139580 | A1 | 5/2023 | Naiki et al. | |
| 2023/0313608 | A1 | 10/2023 | Lin | |
| 2023/0313611 | A1 | 10/2023 | Kirby | |

OTHER PUBLICATIONS

Written Opinion on the Patentability of the Invention for FR2308699 dated Feb. 20, 2024.

Office Action dated Dec. 9, 2024 in U.S. Appl. No. 18/802,095.

* cited by examiner

ELECTROMECHANICAL ACTUATOR AND SHADING DEVICE COMPRISING SUCH AN ELECTROMECHANICAL ACTUATOR

TECHNICAL FIELD OF THE INVENTION

The present invention relates to an electromechanical actuator of a shading device, in other words an electromechanical actuator for a shading device.

This invention also relates to a shading device comprising a screen moved by such an electromechanical actuator.

In general, the present invention relates to the field of shading devices comprising a motorized driving device moving a screen, between at least one first position and at least one second position.

BACKGROUND OF THE INVENTION

A motorized driving device comprises an electromechanical actuator of a movable closure, shading or sun protection element such as a shutter, door, grid, blind or any other equivalent equipment, hereinafter referred to as a screen.

CN 202 431 792 U is already known, describing an electromechanical actuator of a shading device. The electromechanical actuator comprises a casing, an electric motor, a gearbox, a spring-applied brake and a centring shaft. The gearbox comprises a first reduction stage, a second reduction stage and a third reduction stage. The second reduction stage comprises a sun gear, a planet carrier and a plurality of planet gears. The sun gear comprises a bore. The electric motor, the gearbox and the spring-applied brake are mounted within the casing. The spring-applied brake comprises a coil spring, a drum, an input member and an output member. The drum comprises a friction surface. The friction surface is configured to cooperate with at least one turn of the coil spring. The output member comprises a bore. Furthermore, the centring shaft is mounted inside the bore of the output member and the bore of the sun gear.

Moreover, in this document CN 202 431 792 U, the output member of the spring-applied brake and the sun gear of the second reduction stage form a single piece, so that the bore of the output member and the bore of the sun gear are common and form a single bore.

However, document CN 202 431 792 U is silent on the centring of the planet carrier of the second reduction stage in relation to the drum.

Generally, in electromechanical actuators intended for a shading device, the centring of the planet carrier of the second reduction stage with respect to the drum is implemented by means of one or more rings of the gearbox.

However, these electromechanical actuators have the disadvantage that the centring of the planet carrier of the second reduction stage with respect to the drum is of poor precision since it is subject to geometric faults of the ring(s) of the gearbox, in particular when they are made of plastic.

Furthermore, the planet carrier of the second reduction stage is centred, via planet gears, inside a ring of this second reduction stage, which is generally made of plastic. This centring of the planet carrier of the second reduction stage achieved by sections of the ring of this second reduction stage is of low precision, which risks generating an operating noise of the gearbox and/or reducing its efficiency.

SUMMARY OF THE INVENTION

The purpose of the present invention is to overcome the aforementioned disadvantages and to propose an electromechanical actuator of a shading device, as well as a shading device comprising such an electromechanical actuator, making it possible to radially centre a planet carrier of a reduction stage of a gearbox with respect to a drum of a spring-applied brake, in a direction orthogonal to an axis of rotation of the gearbox and of the spring-applied brake, and to produce an axial limit stop of the planet carrier of the reduction stage with respect to the drum, in the direction of the axis of rotation.

To this end, the present invention relates, according to a first aspect, to an electromechanical actuator of a shading device, the electromechanical actuator comprising at least:
- a casing,
- an electric motor,
- a gearbox, the gearbox comprising at least one reduction stage, the reduction stage comprising a sun gear, a planet carrier and a plurality of planet gears, the sun gear comprising at least one bore,
- a spring-applied brake, and
- a centring shaft, the electric motor, the gearbox and the spring-applied brake being mounted within the casing, the spring-applied brake comprising at least:
- a coil spring,
- a drum, the drum comprising a friction surface, the friction surface being configured to cooperate with at least one turn of the coil spring,
- an input member, and
- an output member, the output member comprising at least one first bore, the centring shaft being mounted inside the first bore of the output member and the bore of the sun gear.

According to the invention, the drum comprises a shoulder. Furthermore, the planet carrier of the reduction stage is configured to bear against the shoulder of the drum.

Thus, the shoulder makes it possible to radially centre the planet carrier of the reduction stage with respect to the drum, in a direction orthogonal to an axis of rotation of the gearbox and the spring-applied brake, and to produce an axial limit stop of the planet carrier of the reduction stage with respect to the drum, in the direction of the axis of rotation.

In this way, the area in which the planet carrier of the reduction stage bears against the drum, in the direction of the axis of rotation, is limited to a diameter, in other words a radial width, of the shoulder.

Therefore, the axial limit stop of the planet carrier of the reduction stage with respect to the drum created by the shoulder of the drum makes it possible to eliminate the axial forces exerted on the input member and the output member.

According to an advantageous feature of the invention, the spring-applied brake further comprises a cover. Furthermore, the shoulder of the drum constitutes an axial limit stop of the planet carrier of the reduction stage with respect to the drum, ensuring an operating play between the cover and the planet carrier of the reduction stage.

According to another advantageous feature of the invention, the drum comprises a housing, the housing being cylindrical in shape. The friction surface is an internal surface of the drum radially delimiting the housing. Furthermore, the friction surface of the drum has a diameter less than or equal to forty-five millimetres.

According to another advantageous feature of the invention, the planet carrier comprises at least one bore. The gearbox further comprises a further reduction stage, the further reduction stage comprising a further sun gear, a plurality of further planet gears and a further planet carrier, the further sun gear comprising at least one bore, the further planet carrier comprising at least one bore. Furthermore, the centring shaft is mounted inside the bore of the planet carrier of the reduction stage, the bore of the further sun gear of the further reduction stage and the bore of the further planet carrier of the further reduction stage.

According to another advantageous feature of the invention, the input member further comprises a first bore and a second bore. The centring shaft is mounted with a loose fit inside the second bore of the input member. The centring shaft is mounted with an interference fit inside the bore of the further planet carrier of the further reduction stage. Furthermore, the centring shaft is mounted with a loose fit inside the first bore of the output member.

According to another advantageous feature of the invention, the planet carrier of the reduction stage comprises a coupling interface. The output member comprises a coupling interface. The coupling interface of the planet carrier of the reduction stage and the coupling interface of the output member are identical. The sun gear of the reduction stage has a first set of teeth. The further sun gear of the further reduction stage has a first set of teeth. Furthermore, the first set of teeth of the sun gear of the reduction stage and the first set of teeth of the further sun gear of the further reduction stage are identical.

According to another advantageous feature of the invention, the input member comprises at least one first bore. The output member further comprises a second bore. The spring-applied brake further comprises a bushing, the bushing comprising at least one bore, the centring shaft being mounted inside the bore of the bushing. The bushing is mounted inside the first bore of the input member with an interference fit. Furthermore, the bushing is mounted inside the second bore of the output member with a loose fit.

According to another advantageous feature of the invention, the drum is made of steel or plastic.

According to another advantageous feature of the invention, the planet carrier of the reduction stage is made of plastic.

In a second aspect, the present invention relates to a shading device, the shading device comprising at least:

- a screen, and
- an electromechanical actuator according to the invention and as mentioned above, the screen being moved by the electromechanical actuator.

This shading device has similar features and advantages to those described above, in relation to the electromechanical actuator according to the invention.

Further features and advantages of the invention will become apparent from the following description, made with reference to the attached drawings, which are given as non-limiting examples and wherein:

DETAILED DESCRIPTION OF SOME EMBODIMENTS

Figure 1:
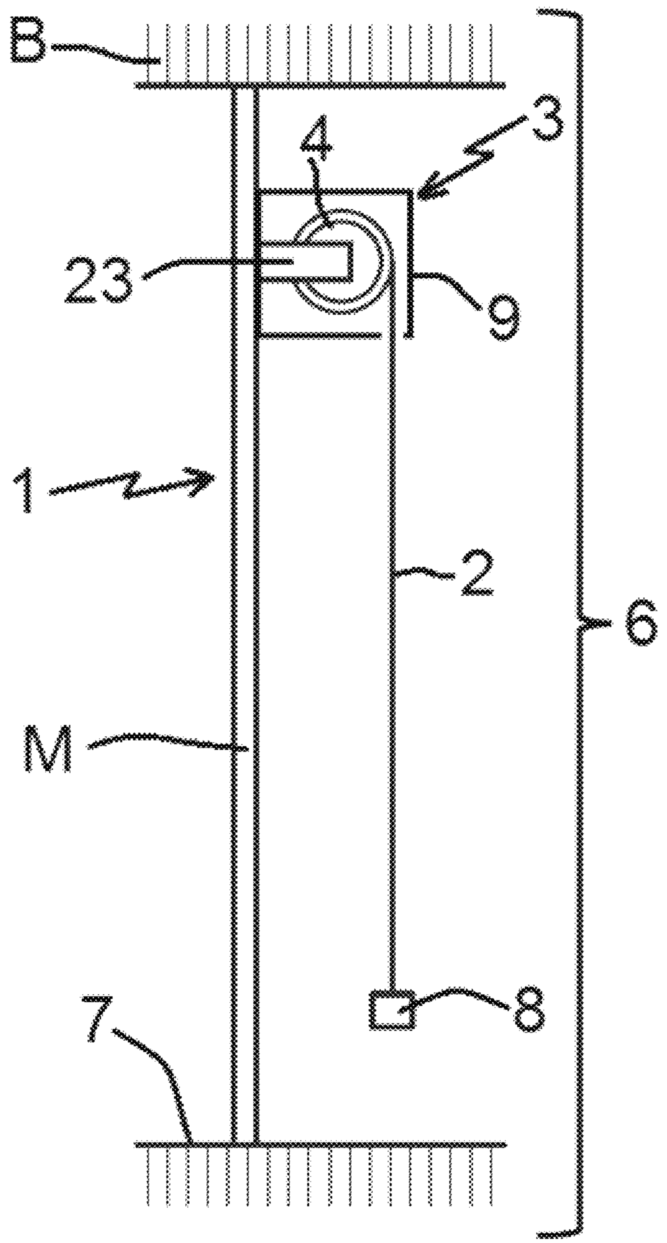
FIG. 1 is a schematic transverse cross-section view of an installation comprising a shading device according to one embodiment of the invention.
Figure 2:
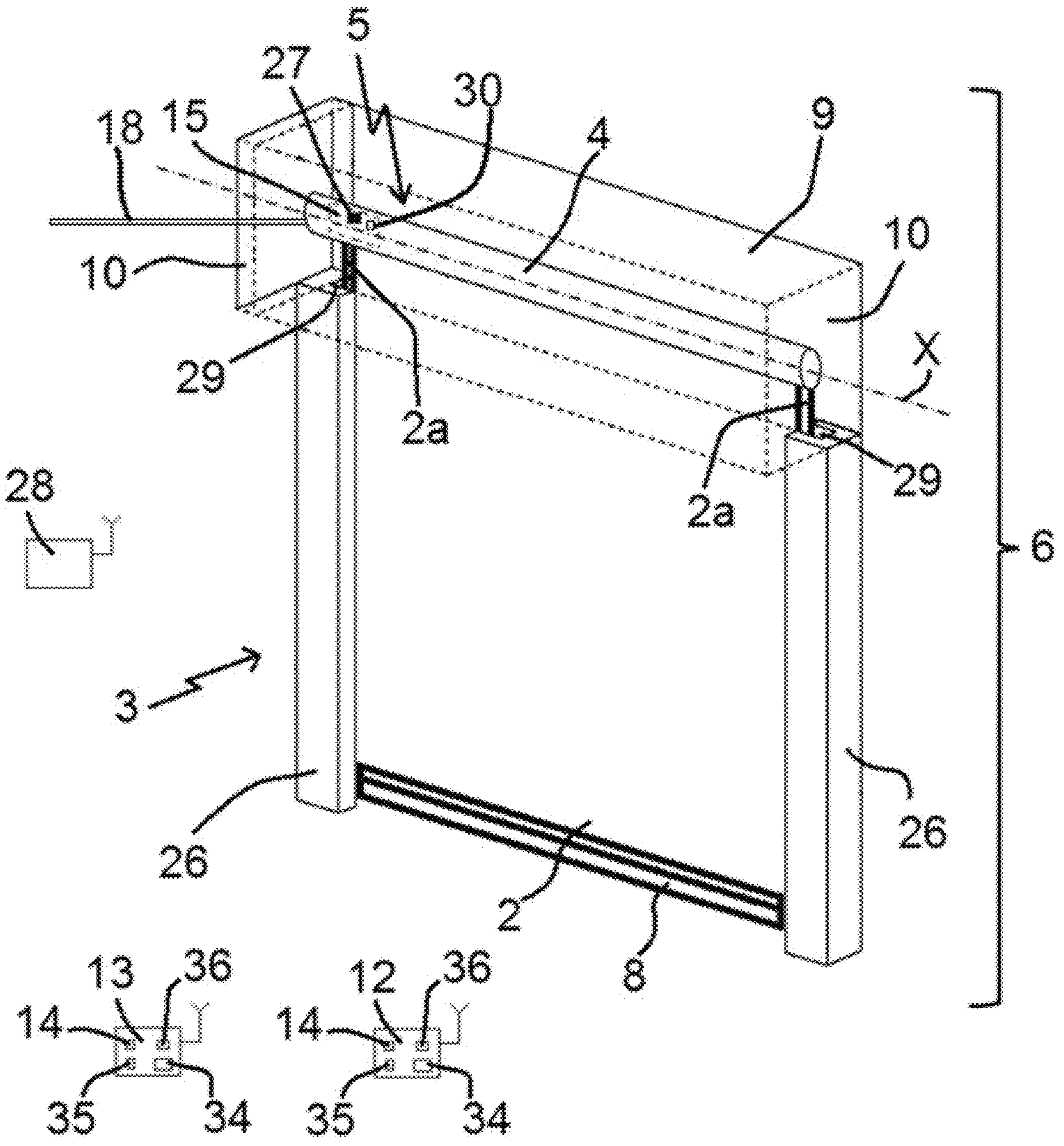
FIG. 2 is a schematic perspective view of the installation illustrated in FIG. 1.

Firstly, with reference to FIGS. 1 and 2, an installation 6 comprising a closure, shading or solar protection device 3 according to one embodiment of the invention is described. This installation 6, installed in a building B, comprises an opening 1, in which a window or a door, not shown, is arranged. This installation 6 is equipped with a screen 2 belonging to the closure, shading or solar protection device 3, in particular a motorized blind.

The closure, shading, or solar protection device 3 is hereinafter referred to as "shading device". The shading device 3 comprises the screen 2.

The shading device 3 can be a blind, in particular a blind with a roll-up fabric, a blind with a pleated or honeycombed screen or a blind with adjustable slats, or a roller shutter. This invention is applicable to all types of shading devices.

Here, the installation 6 comprises the shading device 3.

With reference to FIGS. 1 and 2, a roller blind according to one embodiment of the invention is described.

The shading device 3 comprises a motorized driving device 5. The motorized driving device 5 comprises an electromechanical actuator 11 illustrated in FIGS. 3 to 5.

The screen 2 is configured to be moved, in other words is moved, by means of the motorized driving device 5 and, more particularly, the electromechanical actuator 11.

Advantageously, the motorized driving device 5 and, therefore, the shading device 3 further comprises a winding tube 4. Furthermore, the winding tube 4 is arranged to be rotated by the electromechanical actuator 11.

Here, the screen 2 can be rolled onto the winding tube 4.

Thus, the screen 2 of the shading device 3 is rolled onto the winding tube 4 or unwound around it, the winding tube 4 being driven by the motorized driving device 5, in particular by the electromechanical actuator 11.

In this way, the screen 2 is mobile between a rolled position, in particular a high position, and an unrolled position, in particular a low position, and vice-versa.

The screen 2 of the shading device 3 is a closure, shading, and/or solar protection screen, which can be wound and unwound around the winding tube 4, the inner diameter of which is greater than the outer diameter of the electromechanical actuator 11, so that the electromechanical actuator 11 can be inserted into the winding tube 4, when the shading device 3 is assembled.

Advantageously, the shading device 3 further comprises a holding device 9, 23.

Advantageously, the holding device 9, 23 can comprise two supports 23. One support 23 is arranged at each end of the winding tube 4, in particular in an assembled configuration of the shading device 3.

Thus, the winding tube 4 is held by the supports 23. Only one of the supports 23 is visible in FIG. 1 and they are not shown in FIG. 2. The supports 23 allow the shading device 3 to be mechanically connected to the structure of the building B, especially to a wall M of the building B.

Advantageously, the holding device 9, 23 can comprise a box 9. Furthermore, the winding tube 4 and at least part of the screen 2 are housed within the box 9, in particular in the assembled configuration of the shading device 3.

Generally, the box 9 is arranged above the opening 1, or at the upper part of the opening 1.

Here and as illustrated in FIG. 1, the supports 23 are also housed within the box 9.

Advantageously, the box 9 comprises two cheeks 10, as illustrated in FIG. 2. One cheek 10 is arranged at each end of the box 9, in particular in the assembled configuration of the shading device 3.

In a variant, illustrated in FIG. 2, the winding tube 4 is held via the box 9, in particular via the cheeks 10 of the box 9, without using supports, such as the supports 23 mentioned above.

Advantageously, the shading device 3 can also comprise two lateral slides 26, as illustrated only in FIG. 2. Each lateral slide 26 comprises a groove 29. Each groove 29 of one of the lateral slides 26 cooperates, in other words is configured to cooperate, with a lateral edge 2*a* of the screen 2, in particular in the assembled configuration of the shading device 3, so as to guide the screen 2, during the rolling and unrolling of the screen 2 around the winding tube 4.

The electromechanical actuator 11 is, for example, of the tubular type. This allows the winding tube 4 to be rotated around an axis of rotation X, so that the screen 2 of the shading device 3 can be moved, in particular unrolled or rolled.

In the mounted state of the shading device 3, the electromechanical actuator 11 is inserted into the winding tube 4.

Advantageously, the shading device 3 further comprises a load bar 8 for exerting tension on the screen 2.

The roller blind, which forms the shading device 3, comprises a fabric, which forms the screen 2 of the roller blind 3. A first end of the screen 2, in particular the upper end of the screen 2, in the assembled configuration of the shading device 3, is fixed to the winding tube 4. Furthermore, a second end of the screen 2, in particular the lower end of the screen 2, in the assembled configuration of the shading device 3, is fixed to the load bar 8.

Here, the fabric forming the screen 2 is made of a textile material.

In an example of realization, not shown, the first end of the screen 2 has a hem through which a rod, in particular made of plastic, is arranged. This hem at the first end of the screen 2 is achieved by sewing the fabric forming the screen 2. When assembling the screen 2 to the winding tube 4, the hem and the rod at the first end of the screen 2 are slid into a groove on the outside of the winding tube 4, in particular over the entire length of the winding tube 4, so that the screen 2 is rigidly connected to the winding tube 4 and can be wound up or unwounded around the winding tube 4.

Whatever the embodiment, the first end of the screen 2 is arranged at the holding device 9, 23.

In the case of a roller blind, the upper rolled position corresponds to a predetermined upper end-of-travel position, or to the bearing of the load bar 8 of the screen 2 against an edge of the box 9 of the roller blind 3, and the lower unrolled position corresponds to a predetermined lower end-of-travel position, or to the bearing of the load bar 8 of the screen 2 against a threshold 7 of the opening 1, or to the complete unrolling of the screen 2.

Advantageously, the motorized driving device 5 is controlled by a command unit. The command unit can be, for example, a local command unit 12 or a central command unit 13.

Advantageously, the local command unit 12 can be connected to the central command unit 13, via a wired or wireless connection.

Advantageously, the central command unit 13 can control the local command unit 12, and other similar local command units distributed throughout the building B.

The motorized driving device 5 is, preferably, configured to execute the commands for moving, in particular for unrolling or rolling, the screen 2 of the shading device 3, which can be emitted, especially, by the local command unit 12 or the central command unit 13.

The installation 6 comprises either the local command unit 12, either the central command unit 13, or the local command unit 12 and the central command unit 13.

Figure 3:
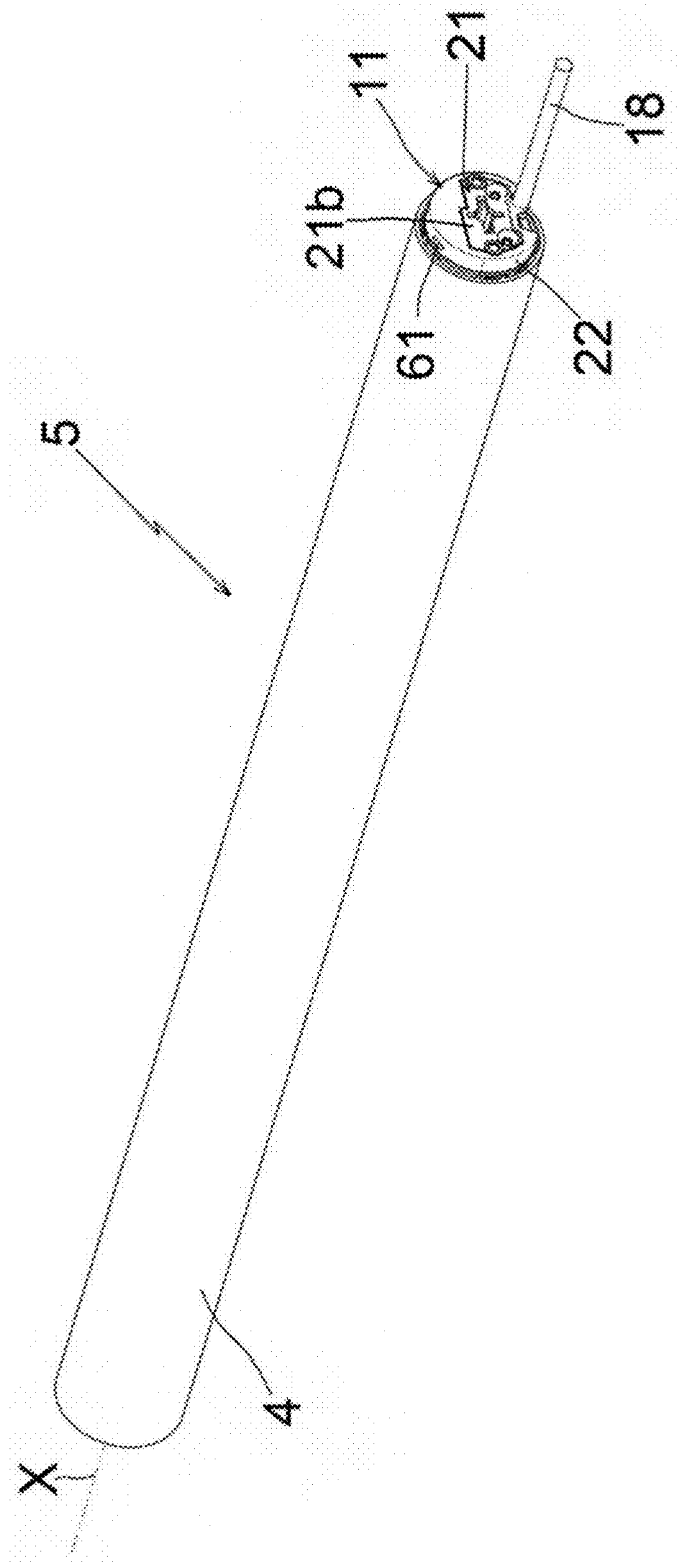
FIG. 3 is a schematic perspective view of a motorized driving device of the installation illustrated in FIGS. 1 and 2, this motorized driving device comprising an electromechanical actuator according to the invention and a winding tube.
Figure 4:
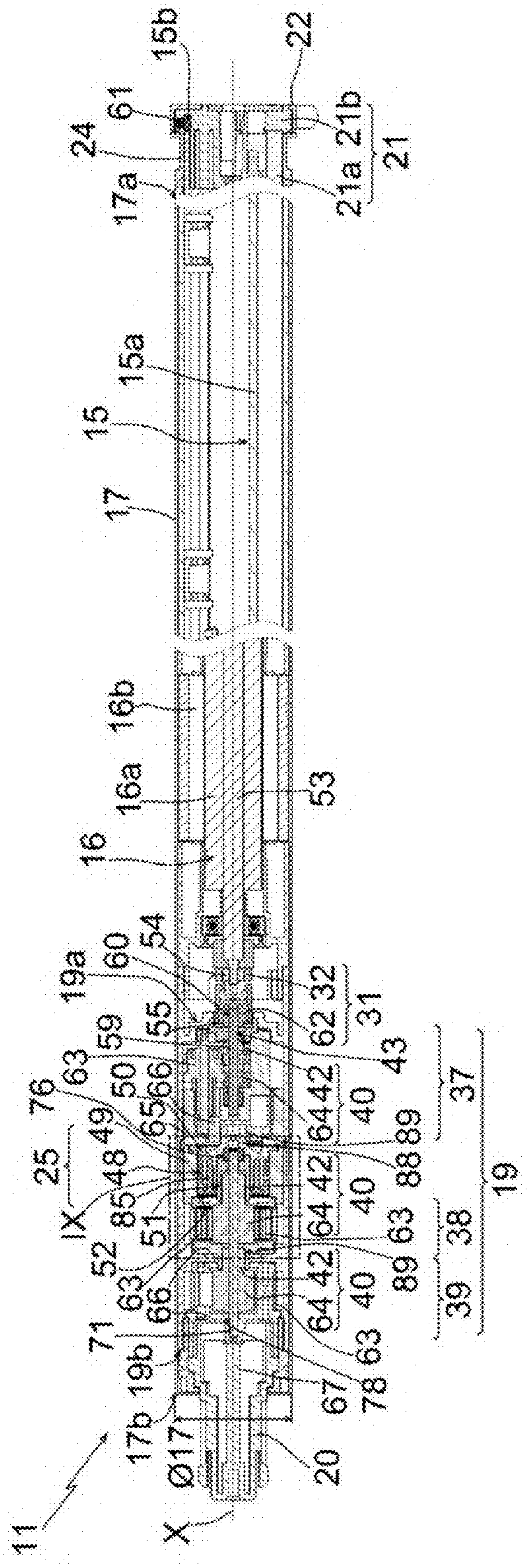
FIG. 4 is a schematic cross-sectional view of the electromechanical actuator illustrated in FIG. 3, according to a sectional plane passing through an axis of rotation of the electromechanical actuator, this schematic cross-sectional view being interrupted locally at two parts of the electromechanical actuator.
Figure 5:
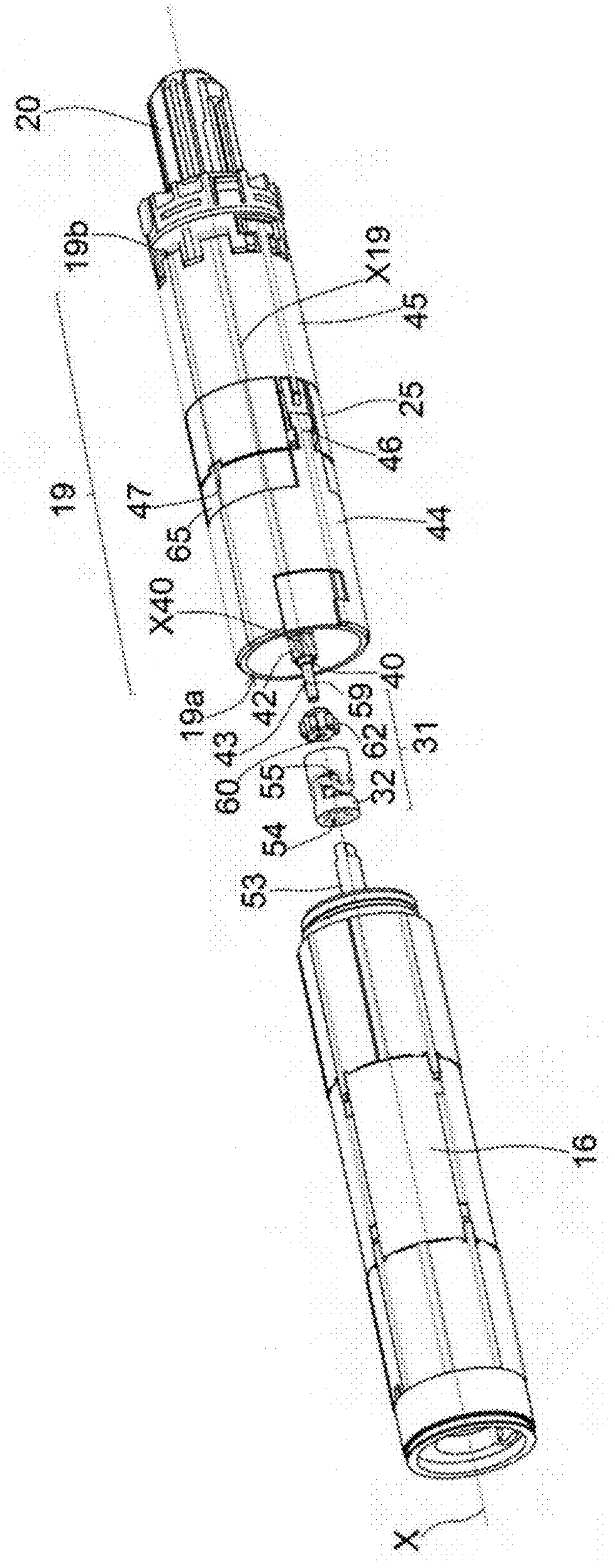
FIG. 5 is a schematic exploded perspective view of part of the electromechanical actuator illustrated in FIG. 4.

The motorized driving device 5, including the electromechanical actuator 11, belonging to the installation 6 and, more particularly, to the shading device 3 illustrated in FIGS. 1 and 2, is now described, in more detail and in reference to FIGS. 3 to 5.

The electromechanical actuator 11 comprises a casing 17, in particular tubular, an electric motor 16 and a gearbox 19.

Here, the electric motor 16 and the gearbox 19 are housed, in other words are mounted, within the casing 17, in particular in an assembled configuration of the electromechanical actuator 11.

Advantageously, the electric motor 16 comprises a rotor 16*a* and a stator 16*b*, as illustrated in FIG. 4.

Here, the rotor 16*a* and the stator 16*b* are positioned coaxially around the axis of rotation X, which is also the axis of rotation of the winding tube 4 in the mounted configuration of the motorized driving device 5.

Advantageously, the electric motor 16 can be of the electronically commutated brushless type, also known as "BLDC" (BrushLess Direct Current) or "permanent magnet synchronous", or DC type or asynchronous type.

Advantageously, the rotor 16*a* of the electric motor 16 comprises a shaft 53.

Here, the casing 17 is hollow. The casing 17 comprises a first end 17*a* and a second end 17*b*. The second end 17*b* is opposite the first end 17*a*.

Here, the casing 17 of the electromechanical actuator 11 is cylindrical in shape, especially rotationally symmetrical around the axis of rotation X, and is open at each of its ends 17*a*, 17*b*.

Advantageously, the casing 17 is a tube with a circular cross-section.

Here, the casing 17 is made of a metallic material.

The material of the casing of the electromechanical actuator is not limiting and can be different. In particular, it can be a plastic material.

Means for controlling the electromechanical actuator 11, allowing the movement of the screen 2 of the shading device 3, are constituted by at least one control unit 15, in particular an electronic control unit.

This control unit 15 belongs to the motorized driving device 5 and, more particularly, to the electromechanical actuator 11 and is able to turn on the electric motor 16 of the electromechanical actuator 11 and, in particular, to enable the supply of electrical energy to the electric motor 16.

Thus, the control unit 15 controls, especially, the electric motor 16, so as to open or close the screen 2, as described previously.

The means of controlling the electromechanical actuator 11 comprise hardware and/or software means.

As a non-limiting example, the hardware means can comprise at least one microcontroller 30, as illustrated in FIG. 2.

Advantageously, the control unit 15 further comprises a first communication module 27, as illustrated in FIG. 2, in particular for receiving command orders, the command orders being emitted by a command transmitter, such as the local command unit 12 or the central command unit 13, these orders being intended to control the motorized driving device 5.

Advantageously, the first communication module 27 of the control unit 15 is wireless. In particular, the first communication module 27 is configured to receive radio command orders.

Advantageously, the first communication module 27 can also allow the reception of command orders transmitted by wired means.

Advantageously, the control unit 15, the local command unit 12 and/or the central command unit 13 can be in communication with a weather station located within the building B or remote outside the building B, including, especially, one or more sensors that can be configured to determine, for example, temperature, brightness, or wind speed, in the case where the weather station is placed outside the building B.

Advantageously, the control unit 15, the local command unit 12, and/or the central command unit 13 can also be in communication with a server 28, as illustrated in FIG. 2, so as to control the electromechanical actuator 11 according to data made available remotely via a communication network, in particular an Internet network that can be connected to the server 28.

The control unit 15 can be controlled from the local command unit 12 and/or the central command unit 13. The local command unit 12 and/or the central command unit 13 is provided with a control keyboard. The control keyboard of the local command unit 12 or the central command unit 13 comprises one or more selection elements 14 and, eventually, one or more display elements 34.

As non-limiting examples, the selection elements can be push buttons and/or touch-sensitive keys. The display elements can be light emitting diodes and/or a display, for example an LCD display (Liquid Crystal Display) or TFT display (Thin Film Transistor). The selection and display elements can also be realised by means of a touch screen.

Advantageously, the local command unit 12 and/or the central command unit 13 comprises at least a second communication module 36.

Thus, the second communication module 36 of the local command unit 12 or the central command unit 13 is configured to emit, in other words emits, command orders, in particular by wireless means, for example radio, and/or by wired means.

Furthermore, the second communication module 36 of the local command unit 12 or the central command unit 13 can also be configured to receive, in other words receives, command orders, in particular via the same means.

Advantageously, the second communication module 36 of the local command unit 12 or the central command unit 13 is configured to communicate, in other words communicates, with the first communication module 27 of the control unit 15.

Thus, the second communication module 36 of the local command unit 12 or the central command unit 13 exchanges command orders with the first communication module 27 of the control unit 15, either monodirectionally or bidirectionally.

Advantageously, the local command unit 12 is a control point, which can be fixed or mobile. A fixed control point can be a control box to be fixed on a façade of the wall M of the building B or on a face of a frame of a window or a door. A mobile control point can be a remote control, a smartphone or a tablet.

Advantageously, the local command unit 12 and/or the central command unit 13 further comprises a controller 35.

The motorized driving device 5, in particular the control unit 15, is, preferably, configured to execute command orders for controlling the movement, especially the closing and the opening, of the screen 2 of the shading device 3. These command orders can be emitted, especially, by the local command unit 12 or by the central command unit 13.

The motorized driving device 5 can be controlled by the user, for example by receiving a command order corresponding to pressing the or one of the selection elements 14 of the local command unit 12 or the central command unit 13.

The motorized driving device 5 can also be controlled automatically, for example by receiving a command order corresponding to at least one signal from at least one sensor, not shown, and/or a signal from a clock, not shown, of the control unit 15, in particular the microcontroller 30. The sensor and/or the clock can be integrated, in a variant, in the local command unit 12 or in the central command unit 13.

Advantageously, the electromechanical actuator 11 further comprises a ring 24, which can also be referred to as a sleeve, as illustrated in FIG. 4.

The ring 24 is arranged, in other words is configured to be arranged, in the vicinity of the first end 17*a* of the casing 17, in particular in the assembled configuration of the electromechanical actuator 11.

Advantageously, the motorized driving device 5 and, more particularly, the electromechanical actuator 11 further comprises an electrical power supply cable 18, as illustrated in FIG. 2.

Advantageously, the control unit 15 can be supplied with electrical energy by means of the electrical power supply cable 18 electrically connected to at least one electrical power supply source, not shown, which can be, for example, an electrical power supply network, in particular the mains or so-called "PoE" (Power over Ethernet), and/or to a battery, which can be rechargeable, especially by means of a photovoltaic panel and/or a charger, not shown, or via the electrical power supply network.

Thus, the electrical power supply cable 18 enables electrical energy to be supplied to the electromechanical actuator 11, in particular the control unit 15 and the electric motor 16, from the electrical power supply source(s).

Advantageously, the electromechanical actuator 11 further comprises an output shaft 20. Furthermore, the output shaft 20 of the electromechanical actuator 11 is arranged, in other words is configured to be arranged, in the vicinity of the second end 17*b* of the casing 17, in particular in the assembled configuration of the electromechanical actuator 11.

Advantageously, the output shaft 20 of the electromechanical actuator 11 is arranged within the winding tube 4 and at least partly outside the casing 17 of the electromechanical actuator 11.

Advantageously, one end of the output shaft 20 of the electromechanical actuator 11 protrudes from the casing 17 of the electromechanical actuator 11, in particular from the second end 17*b* of the casing 17 opposite the first end 17*a*.

Advantageously, the output shaft 20 of the electromechanical actuator 11 is configured to rotate a connecting element, not shown, connected to the winding tube 4. The connecting element is, for example, in the form of a wheel.

When the electromechanical actuator 11 is switched on, the electric motor 16 and the reduction gear 19 rotate the output shaft 20 of the electromechanical actuator 11. Furthermore, the output shaft 20 of the electromechanical actuator 11 rotates the winding tube 4 via the connecting element.

Thus, the winding tube 4 rotates the screen 2 of the shading device 3, so that the opening 1 is opened or closed.

The electromechanical actuator 11 further comprises a spring-applied brake 25.

The spring-applied brake 25 is configured to brake and/or rotationally block the output shaft 20 of the electromechanical actuator 11, so as to regulate the rotational speed of the winding tube 4, when the screen 2 is moved, and to keep the winding tube 4 blocked, when the electromechanical actuator 11 is electrically deactivated.

The spring-applied brake 25 is housed, in other words is mounted, within the casing 17 of the electromechanical actuator 11, in particular in the assembled configuration of the electromechanical actuator 11.

The gearbox 19 comprises at least one reduction stage 37, 38, 39. The reduction stage 37, 38, 39, one of the reduction stages 37, 38, 39 or each reduction stage 37, 38, 39 is of the epicyclic type.

Here and as illustrated in FIG. 4, the gearbox 19 comprises three reduction stages 37, 38, 39. Each of the three reduction stages 37, 38, 39 is of the epicyclic type. The three reduction stages 37, 38, 39 are hereafter referred to as first reduction stage 37, second reduction stage 38 and third reduction stage 39.

The number of reduction stages of the gearbox is not limiting. The number of reduction stages can be one, two, or four or more.

Here and as illustrated in FIG. 4, the spring-applied brake 25 is configured to be arranged, in other words is arranged, between two reduction stages 37, 38, 39, in particular between the first reduction stage 37 and the second reduction stage 38 of the gearbox 19, in particular in the assembled configuration of the electromechanical actuator 11.

Advantageously, the gearbox 19 comprises a first end 19*a* and a second end 19*b*. The second end 19*b* is opposite the first end 19*a*. The first end 19*a* of the gearbox 19 is arranged opposite the electric motor 16, in other words faces the electric motor 16, in particular in the assembled configuration of the electromechanical actuator 11. Furthermore, the second end 19*b* of the gearbox 19 is arranged opposite the output shaft 20 of the electromechanical actuator 11, in other words faces the output shaft 20 of the electromechanical actuator 11, in particular in the assembled configuration of the electromechanical actuator 11.

Here, the first reduction stage 37 is arranged at the first end 19*a* of the gearbox 19. The third reduction stage 39 is arranged at the second end 19*b* of the gearbox 19. Furthermore, the second reduction stage 38 is arranged between the first reduction stage 37 and the third reduction stage 39 and, more particularly, between the spring-applied brake 25 and the third reduction stage 39.

One or each of the first, second and third reduction stages 37, 38, 39 comprises a sun gear 40 and a plurality of planet gears 63, of which there can be three, for example.

The sun gear 40 and the planet gears 63 of the first reduction stage 37 can be referred to as first sun gear and first planet gears. The sun gear and the planet gears of the second reduction stage 38 can be referred to as second sun gear and second planet gears. Furthermore, the sun gear and the planet gears of the third reduction stage 39 can be referred to as third sun gear and third planet gears.

X19 is an axis of rotation of the gearbox 19.

X40 is an axis of rotation of the or each sun gear 40.

The axis of rotation X40 of the or each sun gear 40 coincides with the axis of rotation X19 of the gearbox 19. Therefore, the axis of rotation X40 and the axis of rotation X19 are represented by a same axis line in the figures.

Advantageously, the planet gears 63 of the or each of the first, second and third reduction stages 37, 38, 39 are evenly distributed, around the axis of rotation X19.

The number of planet gears of the first, second and third reduction stages is not limiting and can be different. The number of planet gears of a reduction stage can be two or more.

Advantageously, the sun gear 40 of the or each reduction stage 37, 38, 39 comprises a first sun gear part and a second sun gear part. The first sun gear part comprises a first set of teeth 42. Furthermore, the second sun gear part comprises a second set of teeth 64.

Advantageously, for one or each of the reduction stages 37, 38, 39, the second set of teeth 64 of the second part of the sun gear 40 is angularly offset by half a pitch with respect to the first set of teeth 42 of the first part of the sun gear 40, around the axis of rotation X40 of this sun gear 40.

In a variant, not shown, for one or each of the reduction stages 37, 38, 39, the second set of teeth 64 of the second part of the sun gear 40 is angularly coincident, in other words is not angularly offset, with respect to the first set of teeth 42 of the first part of the sun gear 40, around the axis of rotation X40 of this sun gear 40.

Advantageously, in each of the first, second and third reduction stages 37, 38, 39, the sun gear 40 is meshed, in other words is configured to be meshed, with each planet gear 63 of this reduction stage 37, 38, 39, in particular in an assembled configuration of the gearbox 19.

Advantageously, in each of the first, second and third reduction stages 37, 38, 39, the planet gears 63 are identical, at least in groups of planet gears of a reduction stage 37, 38, 39.

Advantageously, in each of the first, second and third reduction stages 37, 38, 39, the planet gears 63 are eccentric with respect to the axis of rotation X19 of the gearbox 19 and, more particularly, with respect to the sun gear 40 of this reduction stage 37, 38, 39, in particular in the assembled configuration of the gearbox 19.

Thus, for a given reduction stage 37, 38, 39, an axis of rotation of each satellite gear 63 is parallel to, and radially offset from, the axis of rotation X19 of the gearbox 19 and, more particularly, parallel to, and radially offset from, the axis of rotation X40 of the sun gear 40.

Advantageously, the gearbox 19 further comprises an input shaft 43.

Here and as illustrated in FIGS. 4 and 5, a shaft 59 of the sun gear 40 of the first reduction stage 37 forms the input shaft 43 of the gearbox 19.

In a variant, not shown, the sun gear 40 of the first reduction stage 37 is carried by the input shaft 43 of the gearbox 19.

Thus, whatever the example of realization, the sun gear 40 of the first reduction stage 37 is integral with the input shaft 43 of the gearbox 19.

Advantageously, the gearbox 19 further comprises an output shaft 67.

Here, the output shaft 67 of the gearbox 19 is arranged, in other words is configured to be arranged, inside the output shaft 20 of the electromechanical actuator 11, in particular in the assembled configuration of the electromechanical actuator 11.

In a variant, not shown, the output shaft 20 of the electromechanical actuator 11 forms the output shaft 67 of the gearbox 19.

Advantageously, the input shaft 43 and the output shaft 67 of the gearbox 19 are coaxial, in other words are configured to be coaxial, in particular in the assembled configuration of the gearbox 19.

Thus, the input shaft 43 and the output shaft 67 of the gearbox 19 are arranged along the same axis of rotation X19, which is also the axis of rotation of the gearbox 19, in particular in the assembled configuration of the gearbox 19.

Advantageously, the gearbox 19 further comprises at least one ring 65. The or each ring 65 has an internal set of teeth.

Here, the gearbox 19 comprises two rings 65. One of the two rings 65 is formed by combining a second ring of the second reduction stage 38 with a third ring of the third reduction stage 39. This ring 65 is not shown in FIGS. 4, 5 and 9. In this case, the planet gears 63 of the second and third reduction stages 38, 39 are meshed, in other words are configured to be meshed, with the same ring 65, in particular in the assembled configuration of the gearbox 19. In this case, this single ring 65 belongs to the second and third reduction stages 38, 39. Furthermore, in this case, the other of the two rings 65, shown in FIGS. 4 and 5, is formed by the first ring of the first reduction stage 37.

Advantageously, the first ring of the first reduction stage 37 is made of either steel or plastic.

As a non-limiting example, the steel of the first ring of the first reduction stage 37 is sintered steel.

As a non-limiting example, the plastic material of the first ring of the first reduction stage 37 is polybutylene terephthalate, also known as PBT, or polyacetal, also known as POM.

In a variant, not shown, one of the two rings 65 is formed by combining a first ring of the first reduction stage 37 with a second ring of the second reduction stage 38. In this case, the planet gears 63 of the first and second reduction stages 37, 38 are meshed, in other words are configured to be meshed, with the same ring 65, in particular in the assembled configuration of the gearbox 19. In this case, this single ring 65 belongs to the first and second reduction stages 37, 38. Furthermore, in this case, the other of the two rings 65 is formed by a third ring of the third reduction stage 39.

In a variant, not shown, the gearbox 19 comprises three rings 65. The three rings 65 can be referred to as first ring, second ring and third ring. Each planet gear 63 of each of the first, second and third reduction stages 37, 38, 39 is meshed, in other words is configured to be meshed, with the ring 65, in particular with the internal teeth of the ring 65, of this reduction stage 37, 38, 39, in particular in the assembled configuration of the gearbox 19. In this case, the first, second and third rings 65 belong to one of the first, second and third reduction stages 37, 38, 39 respectively.

In another variant, not shown, the gearbox 19 comprises a single ring 65. In this case, the planet gears 63 of each of the first, second and third reduction stages 37, 38, 39 are meshed, in other words are configured to be meshed, with the single ring 65, in particular with the internal teeth of the single ring 65, in particular in the assembled configuration of the gearbox 19. In this case, this single ring 65 belongs to the first, second and third reduction stages 37, 38, 39.

Advantageously, each of the first, second and third reduction stages 37, 38, 39 further comprise a planet carrier 66.

Advantageously, the planet carrier 66 of the second reduction stage 38 comprises a coupling interface 89. Furthermore, the coupling interface 89 of the planet carrier 66 of the second reduction stage 38 cooperates, in other words is configured to cooperate, with the sun gear 40 of the third reduction stage 39, in particular in the assembled configuration of the electromechanical actuator 11.

Here, the coupling interface 89 of the planet carrier 66 of the second reduction stage 38 is an internal set of teeth. Furthermore, in particular in the assembled configuration of the electromechanical actuator 11, the coupling interface 89 of the planet carrier 66 of the second reduction stage 38 meshes, in other words is configured to mesh, with the sun gear 40 of the third reduction stage 39, especially with the first set of teeth 42 of the sun gear 40 of the third reduction stage 39.

Thus, the coupling interface 89 of the planet carrier 66 of the second reduction stage 38 makes it possible to receive and transmit torque from the electric motor 16 and, in this case, from the second reduction stage 38 to the third reduction stage 39.

Advantageously, the planet carrier 66 of the second reduction stage 38 is made of plastic.

As a non-limiting example, the plastic material of the planet carrier 66 of the second reduction stage 38 is polybutylene terephthalate, also known as PBT, or polyacetal, also known as POM.

Advantageously, the planet carrier 66 of the third reduction stage 39 is integral with the output shaft 67 of the gearbox 19.

Thus, the output shaft 67 of the gearbox 19 is rotated, in particular via the planet carrier 66 of the third reduction stage 39, when the input shaft 43 of the gearbox 19 is rotated, especially when the rotor **16*a* is rotated as a result of electrical activation of the electric motor 16**.

In an example of realization, the planet carrier 66 of the third reduction stage 39 and the output shaft 67 of the gearbox 19 form two separate parts. In this case, in the assembled configuration of the gearbox 19, the two parts are connected, in other words are configured to be connected, together by means of fastening elements, which can be disassembled. As non-limiting examples, the fastening elements can be of the elastic snap-fit or screw-fastening type.

In a variant, not shown, the planet carrier 66 of the third reduction stage 39 and the output shaft 67 of the gearbox 19 form a single piece, which can be produced, for example, by sintering. This piece can be, especially, made of plastic or metal.

Advantageously, the gearbox 19 comprises a first cover 44 and a second cover 45. The first cover 44 is arranged at the first end **19*a* of the gearbox 19. Furthermore, the second cover 45 is arranged at the second end 19*b* of the gearbox 19**.

In an example of realization, the first cover 44 and the ring 65 of the first reduction stage 37 form two separate parts. Furthermore, the second cover 45 and the ring 65 of the third reduction stage 39 form two separate parts. In this case, in the assembled configuration of the gearbox 19, the two parts are connected, in other words are configured to be connected together, either by fitting, either by overmoulding, or by means of fastening elements, which can be disassembled. As non-limiting examples, the fastening elements can be of the elastic snap-fit type or screw-fastening type.

Here, the second cover 45 and the ring 65 of the second reduction stage 38 and the third reduction stage 39 form two separate parts.

In a variant, not shown, in the assembled configuration of the gearbox 19, the first cover 44 is integrated into the ring 65 of the first reduction stage 37, so as to form a single piece. Furthermore, the second cover 45 is integrated into the ring 65 of the third reduction stage 39, so as to form a single piece. In this case, the single piece can be made, for example, by sintering. This piece can be, especially, made of plastic or metal.

Advantageously, in the assembled configuration of the gearbox 19, the first cover 44 is fastened, in other words is configured to be fastened, to the second cover 45, by means of fastening elements 46, only one of which is illustrated in FIG. 5, in particular in the assembled configuration of the gearbox 19.

Here, the fastening elements 46 are elastic snap-fastening elements, two in number and arranged diametrically opposite each other with respect to the axis of rotation X19, in other words at 180° to each other, around the axis of rotation X19.

The number and the type of fastening elements are not limiting and can be different. There can be, for example, three in number and arranged at an angle of 120° to each other, around the axis of rotation of the gearbox. They can be, for example, screw-in fastening elements.

Advantageously, in the assembled configuration of the gearbox 19, the spring-applied brake 25 is held, in other words is configured to be held, by the first and second covers 44, 45, by means of indexing elements 47, only one of which is visible in FIG. 5.

Here, the indexing elements 47 are rotation-blocking elements, around the axis of rotation X19, such as projecting elements cooperating with correspondingly shaped indentations. These indexing elements 47 are two in number and arranged diametrically opposite each other with respect to the axis of rotation X19, in other words at 180° to each other, around the axis of rotation X19.

The number and the type of blocking elements are not limiting and can be different. There can be, for example, three in number and arranged at an angle of 120° to each other, around the axis of rotation of the gearbox.

Advantageously, the gearbox 19 can furthermore comprise a fastening ring, not shown. The fastening ring is fastened, in other words is configured to be fastened, to the casing 17 of the electromechanical actuator 11 by means of at least one fastening element, not shown.

The fastening ring can be fastened to the casing 17 by means of a fastening screw, not shown, passing through a through hole, not shown, in the casing 17 and screwing into a fastening hole of the fastening ring.

The number and the type of fastening elements of the fastening ring to the casing are not limiting. They can be, for example, two or more in number. They can also be, for example, riveting fastening elements.

Advantageously, the electromechanical actuator 11 further comprises a device for detecting an end-of-travel and/or an obstacle, during movement of the screen 2. This device can be mechanical or electronic.

Advantageously, the end-of-travel and/or obstacle detection device is implemented by means of the microcontroller 30 of the control unit 15 and, in particular, by means of an algorithm implemented by this microcontroller 30.

The winding tube 4 is rotated around the axis of rotation X and the casing 17 of the electromechanical actuator 11 and is supported by two pivot connections. The first pivot connection is made at a first end of the winding tube 4 by means of the ring 24. The ring 24 thus makes it possible to create a bearing. The second pivot connection, not shown, is made at a second end of the winding tube 4, opposite the first end.

The ring 24 forms, in other words is configured to form or constitute, a guide bearing guiding the rotation of the winding tube 4, around the casing 17 of the electromechanical actuator 11, in particular in an assembled configuration of the motorized driving device 5 and, therefore, of the shading device 3.

Advantageously, the electromechanical actuator 11 further comprises a torque support 21.

Here, the torque support 21 is arranged at the first end 17*a* of the casing 17 of the electromechanical actuator 11, in particular in the assembled configuration of the electromechanical actuator 11.

The torque support 21 makes it possible to absorb the load applied by the electromechanical actuator 11, in particular the torque exerted by the electromechanical actuator 11, with respect to the structure of the building B. Advantageously, the torque support 21 further allows the load applied by the winding tube 4, especially the weight of the winding tube 4, the electromechanical actuator 11 and the screen 2, to be taken up and to ensure that this load is absorbed by the structure of the building B.

Thus, the torque support 21 allows the electromechanical actuator 11 to be fastened to the holding device 9, 23, in particular to one of the supports 23 or to one of the cheeks 10 of the box 9.

Advantageously, the torque support 21 protrudes from the first end 17*a* of the casing 17 of the electromechanical actuator 11.

Advantageously, the torque support 21 closes off, in other words is configured to close off, the first end 17*a* of the casing 17, in particular in the assembled configuration of the electromechanical actuator 11.

Moreover, the torque support 21 of the electromechanical actuator 11 can support at least part of the control unit 15.

Advantageously, the torque support 21 is fixed to the casing 17 by means of one or more fastening elements, not shown, in particular in the assembled configuration of the electromechanical actuator 11. The fastening element(s) can be, especially, bosses, fastening screws, elastic snap-in fastening elements, grooves fitted into indentations or a combination thereof.

Advantageously, the torque support 21 comprises a first part 21*a*, which can also be referred to as "fixed point", and a second part 21*b*, which can also be referred to as "actuator head".

Advantageously, the first part 21*a* of the torque support 21 is assembled, in other words is configured to be assembled, with the casing 17, in particular in the assembled configuration of the electromechanical actuator 11. Furthermore, the second part 21*b* of the torque support 21 is configured to be assembled, in other words is assembled, with the holding device 9, 23, in particular in an assembled configuration of the electromechanical actuator 11 in the shading device 3.

In an example of realization, the second part 21*b* of the torque support 21 is assembled, in other words is configured to be assembled, on the first part 21*a* of the torque support 21, in particular in the assembled configuration of the electromechanical actuator 11. In this case, the second part 21*b* of the torque support 21 is assembled on the first part 21*a* of the torque support 21 by means of assembly elements.

Thus, the torque support 21 is made up of at least two separate parts, each forming the first and second parts 21*a*, 21*b* of the torque support 21 respectively.

In this way, the second part 21*b* of the torque support 21 can be interchangeable with respect to the first part 21*a* of the torque support 21, especially depending on the shape and the type of the holding elements, not shown, of the holding device 9, 23.

In another example of realization, the torque support 21 can be made of a single piece forming the first and second parts 21*a*, 21*b* of the torque support 21.

Advantageously, the second part 21*b* of the torque support 21 can have different external shapes, especially a fluted shape, as known "star", in other words comprising reliefs on its contour, or a round shape, in other words without reliefs on its contour, as illustrated in FIGS. 3 and 4.

Advantageously, at least a portion of the first part 21*a* of the torque support 21 is generally cylindrical in shape and is arranged, in other words is configured to be arranged, within the casing 17, in particular in the assembled configuration of the electromechanical actuator 11.

Advantageously, an outer diameter of at least a portion of the second part 21*b* of the torque support 21 is larger than an outer diameter Ø17 of the casing 17.

Advantageously, the torque support 21 further comprises a limit stop, not shown. Furthermore, the limit stop is in abutment, in other words is configured to be in abutment, against the casing 17, at the first end 17*a* of the casing 17, in particular in the assembled configuration of the electromechanical actuator 11.

Thus, the limit stop of the torque support 21 makes it possible to limit the depression of the first part 21*a* of the torque support 21 into the casing 17, along the direction of the axis of rotation X.

Here, the limit stop of the torque support 21 comprises a shoulder. More particularly, it is made in the form of a flange, in particular a cylindrical one with a straight generatrix.

Here and as illustrated in FIG. 4, the ring 24 is arranged or inserted, in other words is configured to be arranged or inserted, around the torque support 21, in particular the second part 21*b* of the torque support 21, especially in the assembled configuration of the electromechanical actuator 11. In this case, the ring 24 is mounted free to rotate around the torque support 21, in particular the second part 21*b* of the torque support 21.

In a variant, not shown, the ring 24 is arranged or inserted, in other words is configured to be arranged or inserted, around part of the casing 17, in particular in the assembled configuration of the electromechanical actuator 11. In this case, the ring 24 is mounted free to rotate around the casing 17.

In another variant, not shown, the ring 24 is arranged or inserted, in other words is configured to be arranged or inserted, on the one hand, around the torque support 21 and, on the other hand, around the casing 17 of the electromechanical actuator 11, in particular the first end 17*a* of the casing 17, especially in the assembled configuration of the electromechanical actuator 11. In such a case, the ring 24 can be mounted free to rotate, on the one hand, around the torque support 21 and, on the other hand, around the casing 17 of the electromechanical actuator 11.

Advantageously, the torque support 21 further comprises a cover 22. The cover 22 is mounted, in other words is configured to be mounted, on the torque support 21, especially on the first and/or second parts 21*a*, 21*b* of the torque support 21, in particular in the assembled configuration of the electromechanical actuator 11.

Advantageously, the control unit 15 is arranged at least partly within the casing 17 of the electromechanical actuator 11.

Moreover, the control unit 15 can be at least partly arranged outside the casing 17 of the electromechanical actuator 11 and, in particular, mounted in the torque support 21 or in one of the supports 23.

Advantageously, the control unit 15 comprises a first electronic board 15*a* and a second electronic board 15*b*, as illustrated in FIG. 4.

Here, the first electronic board 15*a* of the control unit 15 is arranged within the casing 17 of the electromechanical actuator 11, in particular in the assembled configuration of the electromechanical actuator 11. Furthermore, the second electronic board 15*b* is arranged within the torque support 21 of the electromechanical actuator 11, in particular in the assembled configuration of the electromechanical actuator 11.

Advantageously, the first electronic board 15*a* is configured to control the electric motor 16. Furthermore, the second electronic board 15*b* is configured, especially, to access functions for setting parameters and/or configuring the electromechanical actuator 11, by means of selection devices 61, one of which is illustrated in FIGS. 3 and 4, and, eventually, display devices, not shown.

Here, the control unit 15, in particular each of the first and second electronic boards 15*a*, 15*b*, is supplied with electrical energy by means of the electrical power supply cable 18.

Advantageously, the torque support 21 comprises, in other words incorporates, at least one selection device 61, in particular a button, which can be, for example, a push button or magnetic. Furthermore, the or each selection device 61 is configured, especially, to carry out an adjustment of the electromechanical actuator 11 through one or more configuration modes, to pair with the electromechanical actuator 11 one or more command units 12, 13, to reset one or more parameters, which can be, for example, an end-of-travel position, to reset the paired command unit(s) 12, 13 or to control the movement of the screen 2.

Advantageously, the torque support 21 comprises, in other words incorporates, at least one display device, not shown. Furthermore, the or each display device is configured, especially, to display a visual indication, which can be, for example, representative of an operating mode of the electromechanical actuator 11, in particular a configuration mode or a control mode, or of a status of a member of the motorized driving device 5.

Advantageously, the electromechanical actuator 11 further comprises a torque transmission device 31.

Here, the torque transmission device 31 comprises a one-piece member 32, which can also be referred to as a universal joint, and a coupling element 62.

The torque transmission device 31 is housed, in other words is mounted, within the casing 17 of the electromechanical actuator 11, in the assembled configuration of the electromechanical actuator 11.

Here, the input shaft 43 of the gearbox 19 is coupled, in other words is configured to be coupled, with the rotor 16*a* of the electric motor 16 via the torque transmission device 31, in particular in the assembled configuration of the electromechanical actuator 11.

Advantageously, the one-piece member 32 comprises a first housing 54. The first housing 54 receives, in other words is configured to receive or to house, part of the shaft 53 of the rotor 16*a* of the electric motor 16, in particular in the assembled configuration of the electromechanical actuator 11.

Here, the part of the shaft 53 of the rotor 16*a* of the electric motor 16 is in direct contact with the first housing 54 of the one-piece member 32.

In a variant, not shown, the torque transmission device 31 further comprises an adapter. The adapter is mounted, in other words is configured to be mounted, on part of the shaft 53 of the rotor 16*a* of the electric motor 16, in particular in the assembled configuration of the electromechanical actuator 11. Mounting can be achieved, for example, by force-fitting the adapter onto the part of the shaft 53 of the rotor 16*a*. In this case, the first housing 54 receives, in other words is configured to receive or to house, the part of the shaft 53 of the rotor 16*a* of the electric motor 16 by means of the adapter, in particular in the assembled configuration of the electromechanical actuator 11. Thus, the part of the shaft 53 of the rotor 16*a* of the electric motor 16 is in contact with the first housing 54 of the one-piece member 32 via the adapter.

Advantageously, the first housing 54 of the one-piece member 32 has a first shape, in particular the shape of a cross. The part of the shaft 53 of the rotor 16*a* has a second shape, in particular a flattened shape, such as, for example, the free end of a slotted screwdriver. Furthermore, the second shape of the part of the shaft 53 of the rotor 16*a* is configured to be inserted, in other words is inserted, inside the first shape of the first housing 54 of the one-piece member 32, in particular in the assembled configuration of the electromechanical actuator 11.

In a variant, not shown, the first shape of the first housing 54 of the one-piece member 32 is slot-shaped.

In another variant, not shown, the first shape of the first housing 54 of the one-piece member 32 comprises holes, which can be, for example, two in number. Furthermore, the second form of the part of the shaft 53 of the rotor 16*a* comprises pins, such as in the shape of a fork and which can be, for example, two in number.

Also in another variant, not shown, the first shape of the first housing 54 of the one-piece member 32 is star-shaped or internally toothed. Furthermore, the second shape of the part of the shaft 53 of the rotor 16*a* is star-shaped or externally toothed.

Advantageously, the one-piece member 32 comprises a second housing 55. The second housing 55 receives, in other words is configured to receive or to house, part of the sun gear 40 of the first reduction stage 37, in particular in the assembled configuration of the electromechanical actuator 11.

Advantageously, the coupling element 62 is assembled, in other words is configured to be assembled, inside the second housing 55 of the one-piece member 32, in particular in an assembled configuration of the torque transmission device 31.

Thus, the coupling element 62 enables the torque supplied by the electric motor 16 to be transmitted from the one-piece member 32 to the gearbox 19, in particular to the first reduction stage 37.

Advantageously, the sun gear 40 of the first reduction stage 37 comprises the shaft 59. Furthermore, the coupling element 62 is assembled on the shaft 59 of the sun gear 40.

Here, the one-piece member 32 and the coupling element 62 are two separate parts which are assembled together, so that they are integral with each other.

Thus, the torque transmission device 31 is a subassembly constituted by the one-piece member 32 and the coupling element 62, so as to transmit a torque between the rotor 16*a* of the electric motor 16 and the input shaft 43 of the gearbox 19, in particular upon electrical activation of the electric motor 16 causing the rotor 16*a* to rotate.

Advantageously, the assembly of the coupling element 62 inside the second housing 55 of the one-piece member 32 is carried by fitting the coupling element 62 into the second housing 55 of the one-piece member 32.

In a variant, the assembly of the coupling element 62 inside the second housing 55 of the one-piece member 32 is carried by overmoulding the one-piece member 32 around the coupling element 62.

Advantageously, the coupling element 62 is made of a metallic material, which can be, for example, sintered steel.

Advantageously, the coupling element 62 comprises an orifice 60. Furthermore, the orifice 60 of the coupling element 62 receives, in other words is configured to receive or to house, the shaft 59 of the sun gear 40 of the first reduction stage 37, in particular in the assembled configuration of the electromechanical actuator 11.

Thus, the second housing 55 of the one-piece member 32 receives, in other words is configured to receive or to house, the shaft 59 of the sun gear 40 of the first reduction stage 37 via the coupling element 62, in particular in the assembled configuration of the electromechanical actuator 11.

In this way, the shaft 59 of the sun gear 40 of the first reduction stage 37 is in contact with the second housing 55 of the one-piece member 32 via the coupling element 62.

Advantageously, the assembly of the coupling element 62 on the shaft 59 of the sun gear 40 of the first reduction stage 37 is carried by force-fitting.

Here and in a non-limiting manner, the coupling element 62 is force-fitted inside the second housing 55 of the one-piece member 32 and is then force-fitted onto the shaft 59 of the sun gear 40 of the first reduction stage 37.

In a variant, not shown, the torque transmission device 31 is without the coupling element 62. Thus, the shaft 59 of the sun gear 40 of the first reduction stage 37 is in direct contact with the second housing 55 of the one-piece member 32. In this case, the shaft 59 of the sun gear 40 of the first reduction stage 37 has a shape, in particular non-circular, compatible with the shape of the second housing 55 of the one-piece member 32.

With reference to FIGS. 6 to 9, the spring-applied brake 25 of the electromechanical actuator 11, illustrated in FIGS. 3 to 5, and the assembly of the spring-applied brake 25 with the gearbox 19 are now described.

The spring-applied brake 25 comprises at least a coil spring 48, a drum 49, an input member 50, an output member 51 and, eventually, a cover 52.

Advantageously, the input member 50 is rotated, in other words is configured to be rotated, by the electric motor 16.

Advantageously, the drum 49 and the first ring 65 of the first reduction stage 37 are two separate parts.

In a variant, not shown, the drum 49 and the first ring 65 of the first reduction stage 37 are made from a single piece.

Advantageously, the drum 49 comprises a housing 56.

Here, the housing 56 of the drum 49 is cylindrical in shape. Furthermore, the housing 56 of the drum 49 is open at both its axial ends.

Advantageously, the coil spring 48, the input member 50, the output member 51 and, eventually, the cover 52 are arranged, in other words are configured to be arranged, at least in part inside the housing 56 of the drum 49, in particular in an assembled configuration of the spring-applied brake 25.

Here, the output member 51 is arranged opposite the input member 50.

Here, the coil spring 48 comprises a plurality of turns.

The coils of the coil spring 48 are centred on an axis coincident with the axis of rotation X, when the spring-applied brake 25 is assembled and then mounted in the electromechanical actuator 11. Similarly, the input member 24 and the output member 25 are centred on an axis coincident with the axis of rotation X, when the spring-applied brake 25 is assembled and then mounted in the electromechanical actuator 11.

The axis of each member 48, 49, 50, 51, 52 of the spring-applied brake 25 is not shown in FIGS. 6 to 9, in order to simplify their reading.

Here, the drum 49 comprises a friction surface 57. The friction surface 57 cooperates, in other words is configured to cooperate, with at least one turn of the coil spring 48, in particular in the assembled configuration of the spring-applied brake 25.

Advantageously, the friction surface 57 is an internal surface of the drum 49 radially delimiting, in other words which radially delimits, the housing 56, in this case on the outside.

Thus, at least one turn of the coil spring 48 is radially constrained by the housing 56 of the drum 49.

Here, the coil spring 48 is clamped inside the housing 56 of the drum 49, so as to frictionally join the coil spring 48 and the drum 49, when the coil spring 48 is at rest.

Advantageously, the coil spring 48 is formed from a wire 58. The coil spring 48 has contiguous coils, when the spring-applied brake 25 is at rest.

A first end of the coil spring 48 forms a first tab 48*a*. A second end of the coil spring 48 forms a second tab 48*b*.

Thus, the coil spring 48 comprises two tabs 48*a*, 48*b*. Only the first tab 48*a* is visible in FIG. 6 and the first and second tabs 48*a*, 48*b* are visible in FIG. 8.

Advantageously, each of the first and second tabs 48*a*, 48*b* extend radially with respect to the axis of rotation X and, in particular, towards the inside of the coil spring 48.

Figure 8:
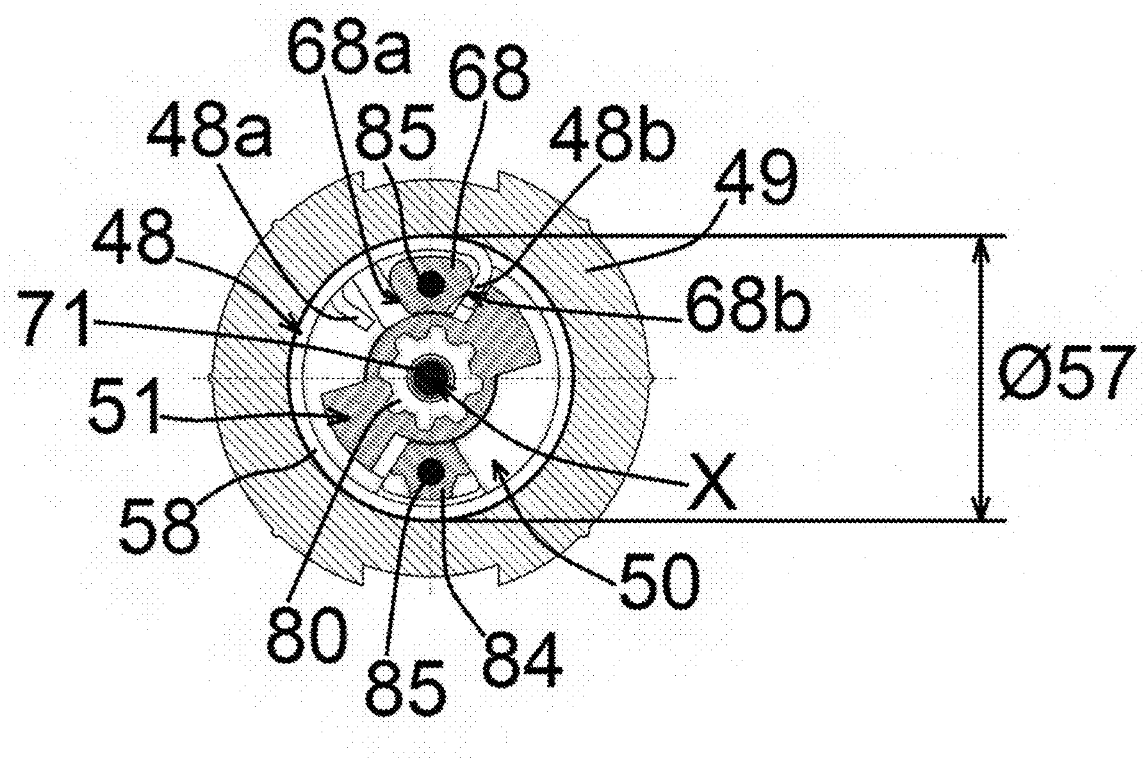
FIG. 8 is a second schematic cross-sectional view of the spring-applied brake illustrated in FIGS. 6 and 7 according to a sectional plane perpendicular to the axis of rotation of the electromechanical actuator illustrated in FIGS. 3 to 5.

In this example of realization, the first and second tabs 48*a*, 48*b* of the coil spring 48 extend radially with respect to the axis of rotation X and towards the interior of the coil spring 48, especially from the turns of the coil spring 48 towards the central axis of the coil spring 48, as illustrated in FIG. 8.

In a variant, not shown, each of the first and second tabs 48*a*, 48*b* of the coil spring 48 extends axially with respect to the axis of rotation X, in particular in the assembled configuration of the spring-applied brake 25.

Advantageously, the input member 50 comprises a drive tooth 68.

Advantageously, the drive tooth 68 extends, in other words is configured to extend, in a direction parallel to the axis of rotation X, between the input member 50 and the cover 52, in particular in the assembled configuration of the spring-applied brake 25.

Advantageously, the drive tooth 68 of the input member 50 is inserted, in other words is configured to be inserted, inside the coil spring 48, in particular in the assembled configuration of the spring-applied brake 25.

Advantageously, the input member 50, in particular the drive tooth 68 of the input member 50, cooperates, in other words is configured to cooperate, with at least one of the first and second tabs 48*a*, 48*b* of the coil spring 48, in particular in the assembled configuration of the spring-applied brake 25, so as to rotate the coil spring 48 around the axis of rotation X in a first direction of rotation.

Such a movement releases the spring-applied brake 25 and, more particularly, the coil spring 48 from the drum 49.

The frictional force between at least one turn of the coil spring 48 and the friction surface 57 of the drum 49 is reduced when the coil spring 48 is rotated in the first direction of rotation.

In other words, this movement tends to reduce the diameter of the outer envelope of the coil spring 48 and therefore to reduce the radial stress between the coil spring 48 and the friction surface 57 of the drum 49.

Thus, the movement generated by the electric motor 16 can be transmitted from the input member 50 to the output member 51.

The outer envelope of the coil spring 48 is defined by the outer generatrices of the coils of the coil spring 48.

Advantageously, the output member 51 comprises at least one lug 69*a*, 69*b*.

Figure 6:
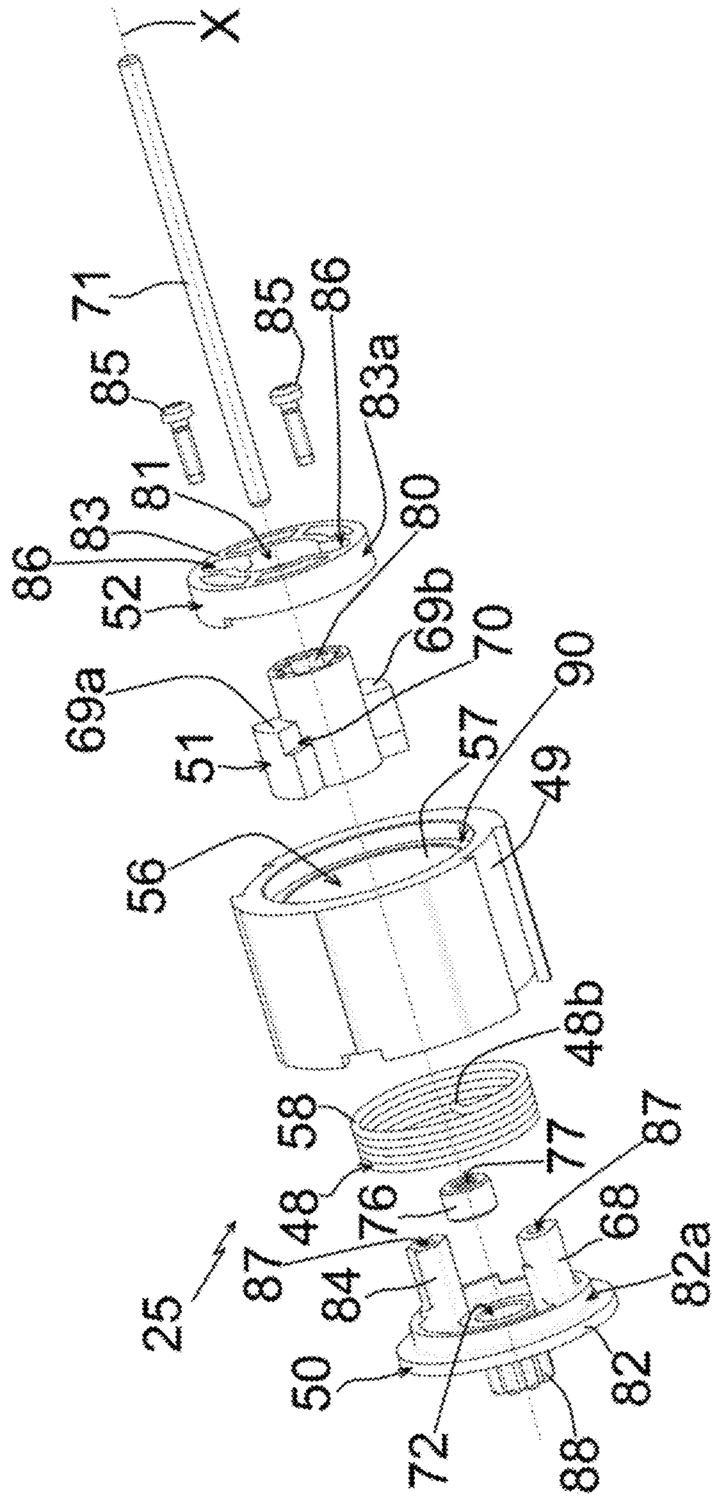
FIG. 6 is a schematic exploded perspective view of a spring-applied brake of the electromechanical actuator illustrated in FIGS. 3 to 5.

Here, the output member 51 comprises a first lug 69*a* and a second lug 69*b*, as illustrated in FIGS. 6 and 8.

Advantageously, the or each of the first and second lugs 69*a*, 69*b* of the output member 51 comprises a recess 70. Only the recess 70 in the first lug 69*a* is visible in FIG. 6.

Here, the recess 70 of the or each of the first and second lugs 69*a*, 69*b* of the output member 51 cooperates, in other words is configured to cooperate, with one of the first and second tabs 48*a*, 48*b* of the coil spring 48, in particular in the assembled configuration of the spring-applied brake 25.

Advantageously, the first and second lugs 69*a*, 69*b* of the output member 51 are arranged symmetrically with respect to the axis of rotation X, so as to ensure that the spring-applied brake 25 is balanced, when the input member 50 rotates with respect to the output member 51 around the axis of rotation X.

Advantageously, the first and second lugs 69*a*, 69*b* of the output member 51 are inserted, in other words configured to be inserted, inside the coil spring 48, in particular in the assembled configuration of the spring-applied brake 25.

Advantageously, the output member 51, in particular one of the first and second lugs 69*a*, 69*b*, cooperates, in other words is configured to cooperate, with at least one of the first and second tabs 48*a*, 48*b* of the coil spring 48, in particular in the assembled configuration of the spring-applied brake 25, so as to rotate the coil spring 48 around the axis of rotation X in a second direction of rotation. The second direction of rotation is opposite to the first direction of rotation.

Such a movement activates the spring-applied brake 25, that is to say that tends to block or brake the rotation of the coil spring 48 inside the housing 56 of the drum 49.

The frictional force between at least one turn of the coil spring 48 and the friction surface 57 of the drum 49 is increased when the coil spring 48 is rotated in the second direction of rotation.

In other words, this movement tends to increase the diameter of the outer envelope of the coil spring 48, in particular by bringing the first and second tabs 48*a*, 48*b* of the coil spring 48 closer together, and therefore to increase the radial stress between the coil spring 48 and the friction surface 57 of the drum 49.

Advantageously, the spring-applied brake 25 includes a lubricant, not shown, located between the coil spring 48 and the friction surface 57 of the drum 49. The lubricant is, preferably, grease.

Advantageously, in the assembled configuration of the spring-applied brake 25, the first tab 48*a* of the coil spring 48 cooperates, in other words is configured to cooperate, with a first face 68*a* of the drive tooth 68 of the input member 50 and the second tab 48*b* of the coil spring 48 cooperates, in other words is configured to cooperate, with a second face 68*b* of the drive tooth 68 of the input member 50. The second face 68*b* of the drive tooth 68 is opposite the first face 68*a* of the drive tooth 68.

Thus, the drive tooth 68 of the input member 50 is arranged between the first and second tabs 48*a*, 48*b* of the coil spring 48 and cooperates, in other words is configured to cooperate with one or other of the tabs 48*a* of the coil spring 48, depending on the rotational drive direction generated by the electric motor 16.

In this way, the first and second faces 68*a*, 68*b* of the drive tooth 68 constitute two drive faces of the coil spring 48. Each drive face 68*a*, 68*b* of the drive tooth 68 cooperates, in other words is configured to cooperate, with one of the first and second tabs 48*a*, 48*b* of the coil spring 48, in particular in the assembled configuration of the spring-applied brake 25.

Here, the recess 70 of the first lug 69*a* of the output member 51 cooperates, in other words is configured to cooperate, with the first tab 48*a* of the coil spring 48, in particular in the assembled configuration of the spring-applied brake 25. Furthermore, the recess 70 of the second lug 69*b* of the output member 51 cooperates, in other words is configured to cooperate, with the second tab 48*b* of the coil spring 48, in particular in the assembled configuration of the spring-applied brake 25.

The electromechanical actuator 11 further comprises a centring shaft 71. The output member 51 comprises a first bore 73. The sun gear 40 of the second reduction stage 38 comprises a bore 75.

Advantageously, the input member 50 comprises a first bore 72. Furthermore, the output member 51 further comprises a second bore 74.

The centring shaft 71 is mounted, in other words is configured to be inserted or housed, inside the first bore 73 of the output member 51 and the bore 75 of the sun gear 40, in particular in the assembled configuration of the electromechanical actuator 11.

Advantageously, the centring shaft 71 is mounted, in other words is configured to be inserted or housed, with a loose fit inside the first bore 73 of the output member 51, in particular in the assembled configuration of the electromechanical actuator 11.

Advantageously, the spring-applied brake 25 further comprises a bushing 76. The bushing 76 comprises a bore 77. The centring shaft 71 is mounted, in other words is configured to be inserted or housed, inside the bore 77 of the bushing 76, in particular in the assembled configuration of the electromechanical actuator 11. The bushing 76 is mounted, in other words is configured to be inserted or housed, inside the first bore 72 of the input member 50 with an interference fit, in particular in the assembled configuration of the spring-applied brake 25. Furthermore, the bushing 76 is mounted, in other words is configured to be inserted or housed, inside the second bore 74 of the output member 51 with a loose fit.

The expression "loose fit" means that the assembly of two parts, one comprising a bore and the other being or comprising a shaft, leaves a play. In other words the fit is positive, so that a radial play exists between the bore and the shaft, that is to say that the shaft has a smaller dimension than the bore.

The expression "interference fit" means that the assembly of two parts, one comprising a bore and the other being or comprising a shaft, is tight. In other words the fit is negative, so that a clamp exists between the bore and the shaft, that is to say that the shaft has a dimension greater than or equal to the bore.

Thus, this construction of the electromechanical actuator 11, where the spring-applied brake 25 is equipped with the bushing 76 mounted inside the first bore 72 of the input member 50 and inside the second bore 74 of the output member 51, enables the output member 51 to be centred with respect to the input member 50 within the spring-applied brake 25, when the gearbox 19 is assembled with the spring-applied brake 25, even when the centring shaft 71 is not inserted in the first bore 72 of the input member 50, in the bore 77 of the bushing 76, in the first bore 73 of the output member 51 and in the bore 75 of the sun gear 40 of the second reduction stage 38.

Furthermore, the bushing 76 ensures precise centring of the centring shaft 71 inside the spring-applied brake 25 and the second reduction stage 38, arranged between the spring-applied brake 25 and the output shaft 20, in particular the second and third reduction stages 38, 39, arranged between the spring-applied brake 25 and the output shaft 20.

Moreover, in the assembled configuration of the spring-applied brake 25, the centring shaft 71 is mounted, in other words is configured to be inserted or housed, in the first and second bores 73, 74 of the output member 51, in the bore 77 of the bushing 76, in the first bore 72 of the input member 50.

Here, the centring shaft 71 is centred with respect to the axis of rotation X, in particular in the assembled configuration of the electromechanical actuator 11.

Advantageously, the bushing 76 is made of bronze.

The material of the bushing is not limiting and can be different. It can be, for example, a sintered steel or a plastic, such as polyacetal, also known as POM, or polytetrafluoroethylene, also known as PTFE.

Advantageously, the planet carrier 66 of the second reduction stage 38 comprises a bore 78. The sun gear 40 of the third reduction stage 39 also comprises a bore 75. The planet carrier 66 of the third reduction stage 39 also comprises a bore 78. Furthermore, the centring shaft 71 is mounted, in other words is configured to be inserted or housed, inside the bore 78 of the planet carrier 66 of the second reduction stage 38, the bore 75 of the sun gear 40 of the third reduction stage 39 and the bore 78 of the planet carrier 66 of the third reduction stage 39, in particular in the assembled configuration of the electromechanical actuator 11.

Advantageously, the input member 50 further comprises a second bore 79. Furthermore, the centring shaft 71 is mounted, in other words is configured to be inserted or housed, with a loose fit inside the second bore 79 of the input member 50, in particular in the assembled configuration of the electromechanical actuator 11.

Advantageously, the input member 50 comprises a coupling interface 88. The planet carrier 66 of the first reduction stage 37 comprises a coupling interface 89, which in this case is identical to that of the planet carrier 66 of the second reduction stage 38. Furthermore, the coupling interface 89 of the planet carrier 66 of the first reduction stage 37 cooperates, in other words is configured to cooperate, with the coupling interface 88 of the input member 50, in particular in the assembled configuration of the electromechanical actuator 11.

Here, the coupling interface 89 of the planet carrier 66 of the first reduction stage 37 is an internal set of teeth. The coupling interface 88 of the input member 50 is an external set of teeth. Furthermore, the coupling interface 89 of the planet carrier 66 of the first reduction stage 37 meshes, in other words is configured to mesh, with the coupling interface 88 of the input member 50, in particular in the assembled configuration of the electromechanical actuator 11.

Thus, the coupling interface 89 of the planet carrier 66 of the first reduction stage 37 makes it possible to receive and transmit torque from the electric motor 16 and, in this case, from the first reduction stage 37 to the spring-applied brake 25.

Advantageously, the centring shaft 71 is mounted, in other words is configured to be inserted or housed, with an interference fit inside the bore 78 of the planet carrier 66 of the third reduction stage 39, in particular in the assembled configuration of the electromechanical actuator 11.

In a variant, not shown, the centring shaft 71 is mounted, in other words is configured to be inserted or housed, inside the bore 78 of the planet carrier 66 of the third reduction stage 39 by means of a further bushing, in particular in the assembled configuration of the electromechanical actuator 11. In this case, the further bushing also comprises a bore. The centring shaft 71 is mounted, in other words is configured to be inserted or housed, inside the bore of the further bushing, in particular in the assembled configuration of the electromechanical actuator 11. Furthermore, the further bushing is mounted, in other words is configured to be inserted or housed, inside the bore 78 of the planet carrier 66 of the third reduction stage 39 with an interference fit, in particular in the assembled configuration of the electromechanical actuator 11.

Advantageously, the centring shaft 71 is mounted, in other words is configured to be inserted or housed, with a loose fit inside the bore 75 of the sun gear 40 of the second reduction stage 38, as well as the third reduction stage 39, in particular in the assembled configuration of the electromechanical actuator 11.

Advantageously, the output member 51 comprises a second coupling interface 80. Furthermore, the second coupling interface 80 of the output member 51 cooperates, in other words is configured to cooperate, with the sun gear 40 of the second reduction stage 38, in particular in the assembled configuration of the electromechanical actuator 11.

Here, the second coupling interface 80 of the output member 51 is an internal set of teeth. Furthermore, the second coupling interface 80 of the output member 51 meshes, in other words is configured to mesh, with the sun gear 40 of the second reduction stage 38, especially with the first set of teeth 42 of the sun gear 40 of the second reduction stage 38, in particular in the assembled configuration of the electromechanical actuator 11.

Thus, the second coupling interface 80 of the output member 51 makes it possible to receive torque from the electric motor 16 and, in this case, from the spring-applied brake 25, and transmit it to the second reduction stage 38.

Advantageously, the coupling interface 89 of the planet carrier 66 of the first reduction stage 37 and of the second reduction stage 38, the coupling interface 88 of the input member 50 and the coupling interface 80 of the output member 51 are respectively centred with respect to the axis of rotation X, in particular in the assembled configuration of the electromechanical actuator 11.

Advantageously, the coupling interface 89 of the planet carrier 66 of the second reduction stage 38, the coupling interface 80 of the output member 51 and, eventually, the coupling interface 89 of the planet carrier 66 of the first reduction stage 37 are identical, in this case having the same internal set of teeth. Furthermore, the first set of teeth 42 of the sun gear 40 of the second reduction stage 38 and the first set of teeth 42 of the sun gear 40 of the third reduction stage 39 and, eventually, the coupling interface 88 of the input member 50, in this case the set of teeth constituting it, are identical.

Advantageously, the cover 52 comprises at least one opening 81. Furthermore, the opening 81 in the cover 52 is through going. The opening 81 in the cover 52 cooperates, in other words is configured to cooperate, with the coupling interface 80 of the output member 51, in particular in the assembled configuration of the spring-applied brake 25.

Thus, the coupling interface 80 of the output member 51 is inserted into the opening 81 of the cover 52, so as to extend on either side of the cover 52, in particular in the assembled configuration of the spring-applied brake 25.

Advantageously, the input member 50 comprises a first plate 82. Furthermore, the cover 52 comprises a second plate 83.

Advantageously, in the assembled configuration of the spring-applied brake 25, the first tab **48*a* of the coil spring 48 extends along the first plate 82 of the input member 50 and the second tab 48*b* of the coil spring 48 extends along the second plate 83 of the cover 52**.

Here, the first plate 82 is integral with the drive tooth 68, preferably made of the same piece.

Figure 7:
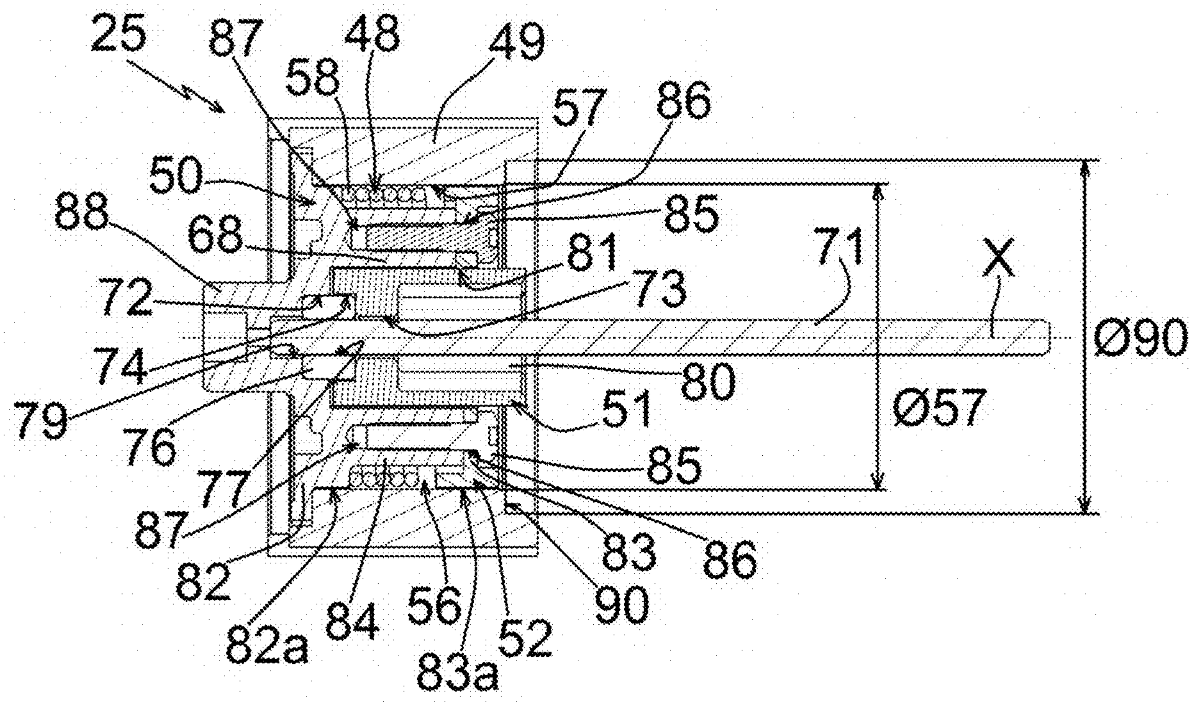
FIG. 7 is a first schematic cross-sectional view of the spring-applied brake illustrated in FIG. 6 according to a sectional plane passing through the axis of rotation of the electromechanical actuator illustrated in FIGS. 3 to 5.
Figure 9:
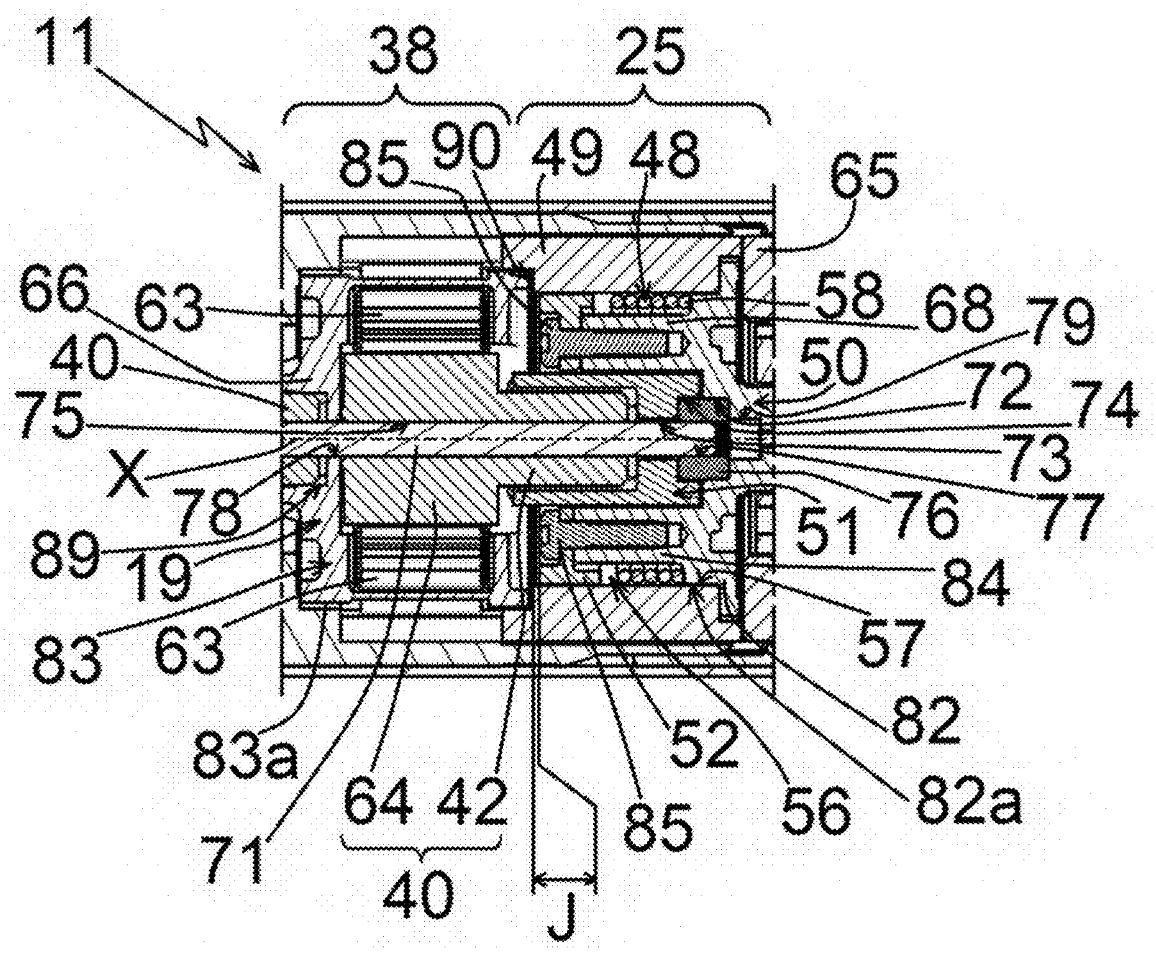
FIG. 9 is a schematic cross-sectional view, in detail and on a larger scale, corresponding to box IX, of part of the electromechanical actuator illustrated in FIG. 4.

Here and as illustrated in FIGS. 7 and 9, the coil spring 48 and the output member 51 are held in position axially between the first plate 82 of the input member 50 and the second plate 83 of the cover 52.

Advantageously, the input member 50 and, more particularly, the first plate 82 comprises a spacer 84. The spacer 84 is configured to extend, in other words extends, in a direction parallel to the axis of rotation X, between the input member 50 and the cover 52, in particular in the assembled configuration of the spring-applied brake 25.

Thus, the spacer 84 of the input member 50 makes it possible to maintain an axial spacing between the input member 50 and the cover 52 and, more particularly, between the first and second plates 82, 83.

Here, the spacer 84 of the input member 50 is arranged diametrically opposite the drive tooth 68 of the input member 50, as illustrated in FIGS. 6 to 9.

Furthermore, in this example of realization, the drive tooth 68 of the input member 50 forms another spacer.

Thus, the drive tooth 68 of the input member 50 also makes it possible to maintain the axial spacing between the input member 50 and the cover 52 and, more particularly, between the first and second plates 82, 83.

In a variant, not shown, the cover 52 and, more particularly, the second plate 83 comprises the spacer 84. The spacer 84 then also extends between the input member 50 and the cover 52, in particular in the assembled configuration of the spring-applied brake 25. In this case, the spacer 84 of the cover 52 can be arranged diametrically opposite the drive tooth 68 of the input member 50, with respect to the axis of rotation X, in particular in the assembled configuration of the spring-applied brake 25.

Here, the drive tooth 68 and the spacer 84 enable the spring-applied brake 25, in particular the input member 50, to be produced symmetrically with respect to the axis of rotation X, so as to guarantee balancing of the spring-applied brake 25, during a rotational movement of the input member 50 with respect to the output member 51 around the axis of rotation X.

Here and as illustrated in FIGS. 6, 7 and 9, the first and second plates 82, 83 each comprise a peripheral flange 82*a*, 83*a*. The two peripheral flanges 82*a*, 83*a* are arranged opposite each other along the axis of rotation X, in particular in the assembled configuration of the spring-applied brake 25.

Advantageously, the input member 50 is centred, in other words is configured to be centred, with respect to the housing 56 of the drum 49, in the direction of the axis of rotation X, by means of the peripheral flange 82*a* of the second plate 82 and the friction surface 57 of the drum 49, in particular in the assembled configuration of the spring-applied brake 25.

Advantageously, a first zone for centring the input member 50 with respect to the housing 56 of the drum 49 and a second zone for positioning the bushing 76 within the spring-applied brake 25 are arranged at least partly overlapping along the axis of rotation X. In other words, the first centring zone and the second positioning zone are at least partially opposite each other in a direction orthogonal to the axis of rotation X.

Thus, an overlap, along the axis of rotation X, between the first centring zone and the second positioning zone makes it possible to limit an operating noise of the spring-applied brake 25.

In this way, radial forces generated by the sun gear 40 and the planet gears 63 of the first reduction stage 37 and, more particularly, of each of the first and second reduction stages 37, 38 are transmitted to the drum 49 via the input member 50, so as to limit an operating noise of the spring-applied brake 25.

Advantageously, in the assembled configuration of the spring-applied brake 25, the first tab 48*a* of the coil spring 48 is arranged between the first face 68*a* of the drive tooth 68 of the input member 50 and the spacer 84. Furthermore, the second tab 48*b* of the coil spring 48 is arranged between the second face 68*b* of the drive tooth 68 of the input member 50 and the spacer 84.

Advantageously, the input member 50 and the cover 52 and, more particularly, the first and second plates 82, 83 are held securely in rotation around the axis of rotation X, in particular in the assembled configuration of the spring-applied brake 25.

Here, the input member 50 and the cover 52 are attached to each other by means of fastening elements 85.

Advantageously, the fastening elements 85 of the input member 50 and the cover 52 are screw fastening elements, in particular two in number.

The number of fastening elements of the input member and the cover is not limiting and can be different, in particular greater than or equal to three.

Here, a first fastening element 85 of the input member 50 is arranged at the drive tooth 68 of the input member 50. Furthermore, a second fastening element 85 of the input member 50 is arranged at the spacer 84 of the input member 50.

Here, each of the first and second fastening elements 85 is inserted through a notch 86 of the cover 52, in this case the second plate 83, and then screwed into a screw barrel 87 of the input member 50. Furthermore, a first screw barrel 87 is formed in the drive tooth 68 of the input member 50 and a second screw barrel 87 is formed in the spacer 84 of the input member 50.

In a variant, not shown, the fastening elements 85 of the input member 50 and of the cover 52 are interlocking fastening elements and, in particular, studs arranged at the drive tooth 68 and the spacer 84 and holes made in the cover 52, in this case in the second plate 83.

In a variant, not shown, the input member 50 and the cover 52 can be held together by elastic snap-fastening elements or crimping fastening elements. The fastening elements can be, especially, elastic snap-fit fastening elements or shafts crimped into housings.

In a variant, not shown, the fastening elements 85 of the input member 50 and the cover 52 can be a combination of the various fastening elements described above.

Advantageously, the input member 50 and the output member 51 are made of plastic. Furthermore, the cover 52 is also made of plastic.

As a non-limiting example, the plastic material of the input member 50, the output member 51 and the cover 52 is polybutylene terephthalate, also known as PBT, or polyacetal, also known as POM.

Thus, the use of a plastic material for the input member 50, the output member 51 and the cover 52 reduces the operating noise of the spring-applied brake 25, especially generated by friction against the drum 49.

In a variant, the output member 51 can be made of zamac (an acronym for the names of the metals of which it is composed: zinc, aluminium, magnesium and copper).

Here, the drum 49 is made of steel, especially in sintered steel.

Thus, the use of sintered steel to make the drum 49 makes it possible to reduce the frictional resistance of the coil spring 48 against the friction surface 57 of the drum 49.

In a variant, the drum 49 is made of a plastic material, which can be, for example, polyacetal, also known as POM, polyamide, also known as PA, or polypropylene, also known as PP.

Advantageously, the friction surface 57 of the drum 49 has a diameter Ø57 less than or equal to forty-five millimetres, especially when the external diameter Ø17 of the casing 17 has a value less than or equal to sixty millimetres, preferably less than or equal to twenty-two millimetres and, more particularly, of the order of twenty-one millimetres, especially when the external diameter Ø17 of the casing 17 has a value of forty millimetres.

Thus, the drum 49 has a volume which is maximised by reducing the diameter Ø57 of its friction surface 57.

The drum 49 comprises a shoulder 90. Furthermore, the planet carrier 66 of the second reduction stage 38 is configured to bear against, in other words is designed to bear against, especially as a function of manufacturing tolerances, the shoulder 90 of the drum 49, in particular in the assembled configuration of the electromechanical actuator 11.

Here, the shoulder 90 is a circular bearing surface defined in the vicinity of one end of the drum 49 which is oriented towards the second reduction stage 38, in particular in the assembled configuration of the electromechanical actuator 11.

Thus, the shoulder 90 makes it possible to radially centre the planet carrier 66 of the second reduction stage 38 with respect to the drum 49, in a direction orthogonal to the axis of rotation X, and to provide an axial limit stop of the planet carrier 66 of the second reduction stage 38 with respect to the drum 49 in the direction of the axis of rotation X.

In this way, the zone in which the planet carrier 66 of the reduction stage 38 bears against the drum 49 in the direction of the axis of rotation X, is limited to a diameter Ø90, in other words a radial width or a height, of the shoulder 90.

Therefore, the axial limit stop of the planet carrier 66 of the second reduction stage 38 with respect to the drum 49 created by the shoulder 90 of the drum 49 makes it possible to eliminate the axial forces exerted on the input member 50 and the output member 51.

Furthermore, in the case where the drum 49 is made of a metallic material, in particular sintered steel, the centring of the planet carrier 66 of the second reduction stage 38 with respect to the drum 49 is more precise. The geometry and manufacturing tolerances of metal parts are more precise than those of plastic parts produced by injection moulding.

Therefore, improving the centring accuracy of the planet carrier 66 of the second reduction stage 38 with respect to the drum 49 makes it possible to reduce the operating noise of the gearbox 19, since the planet carrier 66 of the second reduction stage 38 bears against the shoulder 90 of the drum 49 which has improved precision in terms of its geometry, especially in terms of flatness and roughness.

Advantageously, a value of the diameter Ø90 of the shoulder 90 is strictly greater than a value of the diameter Ø57 of the friction surface 57 of the drum 49.

Thus, the housing 56 of the drum 49 is open at the end of the drum 49 where the shoulder 90 is formed and, preferably, at both ends of the housing 56 of the drum 49, that is to say that the housing 56 of the drum 49 is not partially closed by a rim extending towards the axis of rotation X.

In this way, the machining of the friction surface 57 of the drum 49 is simpler to implement, to guarantee a desired surface finish for this friction surface 57, while minimising the cost of obtaining the drum 49.

As a non-limiting example, the value of the diameter Ø90 of the shoulder 90 is of the order of twenty-five millimetres, especially when the external diameter Ø17 of the casing 17 has a value of forty millimetres.

Advantageously, the shoulder 90 of the drum 49 constitutes an axial limit stop of the planet carrier 66 of the second reduction stage 38 with respect to the drum 49, in particular in the direction of the axis of rotation X, ensuring, in other words so as to ensure, an operating play J, in other words a spacing, between the cover 52 and the planet carrier 66 of the second reduction stage 38.

Thus, this operating play J between the cover 52 and the planet carrier 66 of the second reduction stage 38 makes it possible to reduce the operating noise of the gearbox 19.

This positioning of the planet carrier 66 of the second reduction stage 38 with respect to the drum 49 by means of the shoulder 90 of the drum 49 also improves the efficiency of the gearbox 19.

Thanks to the present invention, the shoulder makes it possible to radially centre the planet carrier of the reduction stage with respect to the drum, in a direction orthogonal to an axis of rotation of the gearbox and the spring-applied brake, and to produce an axial limit stop of the planet carrier of the reduction stage with respect to the drum, in the direction of the axis of rotation.

Numerous modifications can be made to the above-described embodiments without departing from the scope of the invention defined by the claims.

In a variant, not shown, the spring-applied brake 25 is configured to be arranged, in other words is arranged, in the assembled configuration of the electromechanical actuator 11, between the control unit 15 and the electric motor 16, in other words at the input of the electric motor 16, or between the gearbox 19 and the output shaft 20, in other words at the output of the gearbox 19, or between the electric motor 16 and the gearbox 19, in other words at the output of the electric motor 16. In the case where the spring-applied brake 25 is arranged between the electric motor 16 and the reduction gear 19, the input shaft 43 of the reduction gear 19 is coupled with, in other words is configured to be coupled with, the rotor **16*a* of the electric motor 16 via the torque transmission device 31 and the spring-applied brake 25, in particular in the assembled configuration of the electromechanical actuator 11**.

Furthermore, the contemplated embodiments and variants can be combined to form new embodiments of the invention, without departing from the scope of the invention defined by the claims.

The invention claimed is:

1. An electromechanical actuator of a shading device, the electromechanical actuator comprising:
- a casing,
- an electric motor,
- a gearbox, the gearbox comprising at least one reduction stage, the reduction stage comprising a sun gear, a planet carrier and a plurality of planet gears, the sun gear comprising at least one bore,
- a spring-applied brake, and
- a centring shaft, the electric motor, the gearbox and the spring-applied brake being mounted within the casing, the spring-applied brake comprising:
- a coil spring,
- a drum, the drum comprising a friction surface, the friction surface being configured to cooperate with at least one turn of the coil spring,
- an input member, and
- an output member, the output member comprising at least one first bore, the centring shaft being mounted inside the first bore of the output member and the bore of the sun gear, wherein the drum comprises a shoulder, and the planet carrier of the reduction stage is configured to bear against the shoulder of the drum, to radially center the planet carrier of the reduction stage with respect to the drum, in a direction orthogonal to an axis of rotation of the electromechanical actuator, and to provide an axial limit stop of the planet carrier of the reduction stage with respect to the drum, in the direction of the axis of rotation.

2. The electromechanical actuator of a shading device according to claim 1, wherein the spring-applied brake further comprises a cover, and the shoulder of the drum constitutes an axial limit stop of the planet carrier of the reduction stage with respect to the drum, ensuring an operating play between the cover and the planet carrier of the reduction stage.

3. The electromechanical actuator of a shading device according to claim 1, wherein the drum comprises a housing, the housing being cylindrical in shape, the friction surface is an internal surface of the drum radially delimiting the housing, and the friction surface of the drum has a diameter less than or equal to forty-five millimetres.

4. The electromechanical actuator of a shading device according to claim 1, wherein the planet carrier comprises at least one bore, the gearbox further comprises a further reduction stage, the further reduction stage comprising a further sun gear, a plurality of further planet gears and a further planet carrier, the further sun gear comprising at least one bore, the further planet carrier comprising at least one bore, and the centring shaft is mounted inside the bore of the planet carrier of the reduction stage, the bore of the further sun gear of the further reduction stage and the bore of the further planet carrier of the further reduction stage.

5. The electromechanical actuator of a shading device according to claim 4, wherein the input member comprises at least a first bore and a second bore, the centring shaft is mounted with a loose fit inside the second bore of the input member, the centring shaft is mounted with an interference fit inside the bore of the further planet carrier of the further reduction stage, and the centring shaft is mounted with a loose fit inside the first bore of the output member.

6. The electromechanical actuator of a shading device according to claim 4, wherein the planet carrier of the reduction stage comprises a coupling interface, the output member comprises a coupling interface, the coupling interface of the planet carrier of the reduction stage and the coupling interface of the output member are identical, the sun gear of the reduction stage comprises a first set of teeth, the further sun gear of the further reduction stage comprises a first set of teeth, and the first set of teeth of the sun gear of the reduction stage and the first set of teeth of the further sun gear of the further reduction stage are identical.

7. The electromechanical actuator of a shading device according to claim 1, the input member comprising at least a first bore, wherein the output member further comprises a second bore, the spring-applied brake further comprises a bushing, the bushing comprising at least one bore, the centring shaft being mounted inside the bore of the bushing, the bushing is mounted inside the first bore of the input member with an interference fit, and the bushing is mounted inside the second bore of the output member with a loose fit.

8. The electromechanical actuator of a shading device according to claim 1, wherein the drum is made of steel.

9. The electromechanical actuator of a shading device according to claim 1, wherein the planet carrier of the reduction stage is made of plastic.

10. A shading device, the shading device comprising:

a screen, and an electromechanical actuator, the screen being moved by the electromechanical actuator, wherein the electromechanical actuator is according to claim 1.

11. The electromechanical actuator of a shading device according to claim 2, wherein the drum comprises a housing, the housing being cylindrical in shape, the friction surface is an internal surface of the drum radially delimiting the housing, and the friction surface of the drum has a diameter less than or equal to forty-five millimetres.

12. The electromechanical actuator of a shading device according to claim 2, wherein the planet carrier comprises at least one bore, the gearbox further comprises a further reduction stage, the further reduction stage comprising a further sun gear, a plurality of further planet gears and a further planet carrier, the further sun gear comprising at least one bore, the further planet carrier comprising at least one bore, and the centring shaft is mounted inside the bore of the planet carrier of the reduction stage, the bore of the further sun gear of the further reduction stage and the bore of the further planet carrier of the further reduction stage.

13. The electromechanical actuator of a shading device according to claim 3, wherein the planet carrier comprises at least one bore, the gearbox further comprises a further reduction stage, the further reduction stage comprising a further sun gear, a plurality of further planet gears and a further planet carrier, the further sun gear comprising at least one bore, the further planet carrier comprising at least one bore, and the centring shaft is mounted inside the bore of the planet carrier of the reduction stage, the bore of the further sun gear of the further reduction stage and the bore of the further planet carrier of the further reduction stage.

14. The electromechanical actuator of a shading device according to claim 5, wherein the planet carrier of the reduction stage comprises a coupling interface, the output member comprises a coupling interface, the coupling interface of the planet carrier of the reduction stage and the coupling interface of the output member are identical, the sun gear of the reduction stage comprises a first set of teeth, the further sun gear of the further reduction stage comprises a first set of teeth, and the first set of teeth of the sun gear of the reduction stage and the first set of teeth of the further sun gear of the further reduction stage are identical.

15. The electromechanical actuator of a shading device according to claim 2, the input member comprising at least a first bore, wherein the output member further comprises a second bore, the spring-applied brake further comprises a bushing, the bushing comprising at least one bore, the centring shaft being mounted inside the bore of the bushing, the bushing is mounted inside the first bore of the input member with an interference fit, and the bushing is mounted inside the second bore of the output member with a loose fit.

16. The electromechanical actuator of a shading device according to claim 3, the input member comprising at least a first bore, wherein the output member further comprises a second bore, the spring-applied brake further comprises a bushing, the bushing comprising at least one bore, the centring shaft being mounted inside the bore of the bushing, the bushing is mounted inside the first bore of the input member with an interference fit, and the bushing is mounted inside the second bore of the output member with a loose fit.

17. The electromechanical actuator of a shading device according to claim 4, the input member comprising at least a first bore, wherein the output member further comprises a second bore, the spring-applied brake further comprises a bushing, the bushing comprising at least one bore, the centring shaft being mounted inside the bore of the bushing, the bushing is mounted inside the first bore of the input member with an interference fit, and the bushing is mounted inside the second bore of the output member with a loose fit.

18. The electromechanical actuator of a shading device according to claim 5, wherein the output member further comprises a second bore, the spring-applied brake further comprises a bushing, the bushing comprising at least one bore, the centring shaft being mounted inside the bore of the bushing, the bushing is mounted inside the first bore of the input member with an interference fit, and the bushing is mounted inside the second bore of the output member with a loose fit.

19. An electromechanical actuator of a shading device, the electromechanical actuator comprising:

a casing, an electric motor, a gearbox, the gearbox comprising at least one reduction stage, the reduction stage comprising a sun gear, a planet carrier and a plurality of planet gears, the sun gear comprising at least one bore, a spring-applied brake, and a centring shaft, the electric motor, the gearbox and the spring-applied brake being mounted within the casing, the spring-applied brake comprising:

a coil spring, a drum, the drum comprising a friction surface, the friction surface being configured to cooperate with at least one turn of the coil spring, an input member, and an output member, the output member comprising at least one first bore, the centring shaft being mounted inside the first bore of the output member and the bore of the sun gear, wherein:

the drum comprises a shoulder, the planet carrier of the reduction stage is configured to bear against the shoulder of the drum, the spring-applied brake further comprises a cover, and the shoulder of the drum constitutes an axial limit stop of the planet carrier of the reduction stage with respect to the drum, ensuring an operating play between the cover and the planet carrier of the reduction stage.

20. An electromechanical actuator of a shading device, the electromechanical actuator comprising:

a casing, an electric motor, a gearbox, the gearbox comprising at least one reduction stage, the reduction stage comprising a sun gear, a planet carrier and a plurality of planet gears, the sun gear comprising at least one bore, a spring-applied brake, and a centring shaft, the electric motor, the gearbox and the spring-applied brake being mounted within the casing, the spring-applied brake comprising:

a coil spring, a drum, the drum comprising a friction surface, the friction surface being configured to cooperate with at least one turn of the coil spring, an input member, and an output member, the output member comprising at least one first bore, the centring shaft being mounted inside the first bore of the output member and the bore of the sun gear, wherein:

the drum comprises a shoulder, the planet carrier of the reduction stage is configured to bear against the shoulder of the drum, the planet carrier comprises at least one bore, the gearbox further comprises a further reduction stage, the further reduction stage comprising a further sun gear, a plurality of further planet gears and a further planet carrier, the further sun gear comprising at least one bore, the further planet carrier comprising at least one bore, and the centring shaft is mounted inside the bore of the planet carrier of the reduction stage, the bore of the further sun gear of the further reduction stage and the bore of the further planet carrier of the further reduction stage.

* * * * *